(12) United States Patent
Binder et al.

(10) Patent No.: US 7,811,352 B2
(45) Date of Patent: *Oct. 12, 2010

(54) FERTILIZER COMPOSITIONS AND METHODS OF USING

(75) Inventors: Thomas Paul Binder, Decatur, IL (US); Philip C. Fass, Ellicott City, MD (US); Steven J. Furcich, Monticello, IL (US); John F. Less, Forsyth, IL (US); Mark G. Matlock, Decatur, IL (US); William A. Torello, S. Deerfield, MA (US)

(73) Assignee: Archer-Daniels-Midland Company, Decatur, IL (US)

( * ) Notice: Subject to any disclaimer, the term of this patent is extended or adjusted under 35 U.S.C. 154(b) by 793 days.

This patent is subject to a terminal disclaimer.

(21) Appl. No.: 11/549,470

(22) Filed: Oct. 13, 2006

(65) Prior Publication Data

US 2007/0131010 A1    Jun. 14, 2007

Related U.S. Application Data

(60) Provisional application No. 60/726,749, filed on Oct. 14, 2005, provisional application No. 60/789,051, filed on Apr. 3, 2006.

(51) Int. Cl.
*C05F 11/08* (2006.01)
*C05F 7/00* (2006.01)
*C05F 5/00* (2006.01)
*C05F 11/00* (2006.01)

(52) U.S. Cl. .................. 71/6; 71/8; 71/11; 71/23; 71/25; 71/26; 71/27

(58) Field of Classification Search ............. 71/6, 71/8, 11, 23, 25, 26, 27
See application file for complete search history.

(56) References Cited

U.S. PATENT DOCUMENTS

| 4,089,899 A | 5/1978 | Greidinger et al. |
| 4,180,392 A | 12/1979 | Ishibashi et al. |
| 4,491,464 A | 1/1985 | Ashmead et al. |

(Continued)

FOREIGN PATENT DOCUMENTS

CA    2033689    10/2001

(Continued)

OTHER PUBLICATIONS

Penas, E.J., Lindgren, D.T., "A Gardner's Guide for Soil and Nutrient Management in Growing Vegetables," Institute of Agriculture and Natural Resources, University of Nebraska-Lincoln, Mar. 1990, available at: http://ianrpubs.unl.edu/horticulture/g945.htm (last visited Sep. 19, 2005).

(Continued)

*Primary Examiner*—Wayne Langel
(74) *Attorney, Agent, or Firm*—K&L Gates LLP

(57) ABSTRACT

Provided are various embodiments of a fertilizer composition. The fertilizer compositions include one or more compounds having a high nitrogen content, which may be measured by a carbon to nitrogen atom ratio. Also provided are methods for increasing nitrogen content in soil, promoting crop production and fertilizing.

13 Claims, 7 Drawing Sheets

U.S. PATENT DOCUMENTS

| | | | |
|---|---|---|---|
| 4,534,782 | A | 8/1985 | Rusznak et al. |
| 5,021,077 | A | 6/1991 | Moore |
| 5,350,735 | A | 9/1994 | Kinnersley et al. |
| 5,411,568 | A | 5/1995 | Moore |
| 5,720,792 | A | 2/1998 | Fischer et al. |
| 5,783,523 | A | 7/1998 | Koskan et al. |
| 5,844,086 | A | 12/1998 | Murray |
| 5,989,429 | A | 11/1999 | Bardinelli et al. |
| 6,074,452 | A | 6/2000 | Rogmann |
| 6,241,795 | B1 | 6/2001 | Svec et al. |
| 6,387,145 | B1 | 5/2002 | Miele et al. |
| 6,395,315 | B1 | 5/2002 | Matsuura |
| 6,406,511 | B2 | 6/2002 | Gunner et al. |
| 6,471,741 | B1 | 10/2002 | Reinbergen |
| 6,485,975 | B1 | 11/2002 | Chaturvedi et al. |
| 6,953,593 | B2 | 10/2005 | Kuhrts |
| 7,198,943 | B2 | 4/2007 | Koda et al. |
| 2002/0011086 | A1 | 1/2002 | Gunner et al. |
| 2003/0145961 | A1 | 8/2003 | Rousu et al. |
| 2003/0154755 | A1 | 8/2003 | Horchler et al. |
| 2004/0025554 | A1 | 2/2004 | Nasholm et al. |
| 2005/0039508 | A1 | 2/2005 | Burnham et al. |
| 2005/0053700 | A1 | 3/2005 | Hale, III |
| 2005/0056064 | A1 | 3/2005 | Joyce |
| 2005/0064086 | A1 | 3/2005 | Hiron et al. |

FOREIGN PATENT DOCUMENTS

| | | | |
|---|---|---|---|
| CN | 1087889 | | 6/1994 |
| CN | 1092398 | | 9/1994 |
| CN | 1110265 | | 10/1995 |
| CN | 1121061 | | 4/1996 |
| CN | 1137030 | | 12/1996 |
| CN | 1149569 | | 5/1997 |
| CN | 1161139 | | 10/1997 |
| CN | 1176240 | | 3/1998 |
| CN | 1271709 | | 11/2000 |
| CN | 1310152 | * | 4/2001 |
| CN | 1389543 | * | 6/2001 |
| CN | 1311174 | | 9/2001 |
| CN | 1311175 | | 9/2001 |
| CN | 1328983 | | 1/2002 |
| CN | 1368490 | | 2/2002 |
| CN | 1381431 | | 11/2002 |
| CN | 1562907 | | 1/2005 |
| CN | 1569757 | | 2/2005 |
| CN | 1611465 | | 5/2005 |
| CN | 1631855 | | 6/2005 |
| HU | 60456 | | 9/1992 |
| JP | 01172310 | | 7/1989 |
| JP | 2064082 | * | 3/1990 |
| JP | 03097684 | | 4/1991 |
| JP | 2000-327469 | | 11/2000 |
| JP | 2003012389 | | 1/2003 |
| KR | 9608658 | | 6/1996 |
| KR | 9701216 | | 2/1997 |
| KR | 2000037208 | | 7/2000 |
| KR | 2000050064 | | 8/2000 |
| KR | 2002006548 | | 1/2002 |
| RO | 116081 | | 10/2000 |
| TW | 572874 | | 1/2004 |

OTHER PUBLICATIONS

Juang, T.C., "The Manufacturing and Application of Organic Compound Fertilizers," Food and Fertilizer Technology Center, Oct. 1, 1996, available at: http://www.fftc.agnet.org/library/article/eb431.html (last visited Nov. 10, 2006).

Koenig, R., Rupp, L., "Selecting and Using Organic Fertilizers," Electronic Publishing, Utah State University Extension, Jan. 1999, HG-509, available at: http://www.ext.usu.edu.

Koenig, R., Rupp, L., "Selecting and Using Inorganic Fertilizers," Electronic Publishing, Utah State University Extension, Jan. 1999, HG-510, available at: http://www.ext.usu.edu.

Gerngross, T.U., Slater, S.C., "How Green are Green Plastics," Scientific American, Aug. 2000, available at: http://www.mindfully.org/Plastic/Biodegrade/Green-PlasticsAug00.htm (last visited Nov. 10, 2006).

EPA, "Source Water Protection Practices Bulletin: Managing Agricultural Fertilizer Application to Prevent Contamination of Drinking Water," U.S. Environmental Protection Agency, Jul. 2001.

Kurdikar, D., et al., "Greenhouse Gas Profile of a Plastic Material Derived from a Genetically Modified Plant," Journal of Industrial Ecology, vol. 4, No. 3, 2001, 107-122.

Soil Test Interpretations and Fertilizer Management for Lawns, Turf, Gardens, and Landscape Plants; Inorganic and Organic Fertilizers; University of Minnesota Extension Service, 2004, available at: http://www.extension.umn.edu/distribution/horticulture/components/1731-15.html (last visited Nov. 10, 2006).

Organic Fertilizer Application Rates & Schedules, Altrum AgGrand Organic Products, available at: http://www.togernet.com/altrum/application_rates.htm (last visited Nov. 10, 2006).

Williams, S., "Common Sense Gardening Part 3: Organic and Inorganic Fertilizers," University of Saskatchewan Extension Division, available at: http://www.gardenline.usask.ca/misc/common3.html (last visited Nov. 10, 2006).

Williams, S., "Fertilizer: Application (Organic vs Inorganic)", University of Saskatchewan Extension Division, available at: http://www.gardenline.usask.ca/misc/fertili2.html (last visited Nov. 10, 2006).

Product Specification Sheet, Liquid Lysine 50% Feed Grade NA, Archer Daniels Midland Company, available at: http:://www.admworld.com/naen/productdb/details.asp?code-1266 (last visited Nov. 10, 2006).

Product Specification Sheet, L-Lysine Monohydrochloride 98.5% Feed Grade, Archer Daniels Midland Company, available at: http:://www.admworld.com/naen/productdb/details.asp?code-1410 (last visited Nov. 10, 2006).

* cited by examiner

FERTILIZER COMPOSITIONS AND METHODS OF USING

CROSS REFERENCE TO RELATED APPLICATIONS

This application claims priority under 35 U.S.C. §119(e) to U.S. Provisional Application Ser. No. 60/726,749, filed Oct. 14, 2005, and to U.S. Provisional Application Ser. No. 60/789,051, filed Apr. 3, 2006, the disclosures of which are incorporated in their entirety by reference herein.

TECHNICAL FIELD

Various non-limiting embodiments of the present disclosure are directed toward a fertilizer. More specifically, non-limiting embodiments are directed toward a fertilizer that provides nitrogen while minimizing the unit cost of the fertilizer. Also provided are methods for increasing nitrogen content in soil, promoting crop production, and fertilizing horticultural or agricultural crops.

BACKGROUND

Application of nutrient fertilizers to soil in which commercial crops, such as, for example, fruits, vegetables, grains, grasses, for example turf grasses, and other horticultural and agricultural products, are planted is one approach for increasing production and growth of such crops or grasses.

Soil nutrients, such as, nitrogen, phosphorus, potassium, and sulfur, as well as trace elements such as iron, zinc, copper, and magnesium, are useful for achieving thriving agriculture and growth of the plants. However, upon repeated planting cycles, the quantity of these nutrients in the soil may be depleted as plants utilize the nutrients. Depletion of nutrient levels in the soil may result in inhibited plant growth and decreased production per acre. To counter this effect, fertilizers have been developed to help replace the depleted vital nutrients in soil so that optimal plant growth and high yields may be obtained.

Fertilizers may be classified as either organic fertilizers or inorganic fertilizers. As used herein, the term "organic" includes having a molecular skeleton comprising a carbon backbone, such as in compositions derived from living matter. Organic fertilizers are made from materials derived from living things. Animal manures, compost, bonemeal, feather meal, and blood meal are examples of common organic fertilizers. Inorganic fertilizers, on the other hand, are manufactured from non-living materials and include, for example, ammonium nitrate, ammonium sulfate, urea, potassium chloride, potash, ammonium phosphate, anhydrous ammonia, and other phosphate salts.

Inorganic fertilizers are readily commercially available and contain nutrients in soluble form that are immediately available to the plant. Inorganic fertilizers are generally inexpensive, having a low unit cost for the desired element. In addition, the exact amount of a given element may be calculated and administered to the plant or soil. However, inorganic fertilizers suffer from disadvantages. First, inorganic fertilizers, especially nitrogen fertilizers, are subject to leaching to levels below the root of the plant. This leaching may occur as a result of rain or irrigation and may result in contamination of ground water, community drinking water, and/or wells by fertilizer components. Such leaching may render the nutrients unavailable to the plant's roots and result in wasted money being spent on the leached fertilizers. Second, excess application of the inorganic fertilizer may result in phytotoxicity, such as, burning of the plant tissue (foliar burn) and roots, particularly with young plants. Finally, inorganic fertilizers may lead to build up of toxic concentrations of salts in the soil due to heavy or non-systematic application of the fertilizer. Alternatively, chemical imbalances may develop if soil nutrient content is not closely monitored.

Organic fertilizers, on the other hand, are typically not immediately available to plants and require soil microorganisms to break the fertilizer components down into simpler structures prior to use by the plants. This break-down occurs over a time period and may provide for slower release of nutrients. Organic fertilizers usually have a low salt index, so larger amounts may be applied at one time without causing injury to the plant. In addition, buildup of toxicity in the soil is unlikely. However, the cost of organic fertilizers, on a unit cost of nutrients basis, is typically higher than the inorganic counterparts making the commercial application of conventional organic fertilizers cost prohibitive. Like inorganic fertilizers, excess application of organic fertilizers may result in burning of plant tissue (foliar burn) and roots.

In addition, organic fertilizers may not only elicit a plant growth response as observed with common inorganic fertilizers, but natural organic fertilizers may also stimulate soil microbial population growth and activities. Increased soil microbial population may have significant beneficial effects on the physical and chemical properties of the soil, as well as increasing disease and pest resistance.

There is, therefore, a need for fertilizers that do not exhibit the disadvantages of known fertilizers, but include many or all of the advantages exhibited by these products.

BRIEF SUMMARY

The various non-limiting embodiments of the present disclosure contemplate fertilizer compositions and various methods of increasing the nitrogen content of soil, promoting crop production, and fertilizing horticultural and agricultural crops, including, for example, turf grass.

According to one non-limiting embodiment, the present disclosure includes a fertilizer composition comprising one or more organic compounds with a high nitrogen content as measured by a C to N ratio. The one or more organic compounds may be selected from the group consisting of a lysine product, a fermentation cell broth, an ammonium salt of an organic acid, an amidated organic carboxylic acid, a soluble plant protein, and mixtures of any thereof.

Other non-limiting embodiments include a fertilizer composition comprising means for increasing the nitrogen content of a soil and a dispersing agent.

Yet other non-limiting embodiments include a method for increasing nitrogen content in soil. The method comprises applying a fertilizer composition, as described herein, to the soil, such that the fertilizer composition promotes plant growth and/or production.

Further non-limiting embodiments include a method of promoting crop production. The method comprises applying a fertilizer composition, as described herein, to a plant or a soil.

In another non-limiting embodiment, a fertilizer composition includes an organic compound selected from the group consisting of a soy powder, a dry lysine product, a liquid lysine product, a lysine fermentation by-product, a threonine fermentation by-product, and combinations of any thereof. Upon application of the organic compound to a turf grass prior to winter dormancy, a color of the turf grass is improved as compared to the turf grass without having the organic compound applied, Methods of fertilizing with the fertilizer composition are also disclosed.

Still further non-limiting embodiments include a method of fertilizing horticultural or agricultural crops. The method comprises applying a fertilizer composition, as described herein, to the horticultural or agricultural crop, such that the fertilizer composition promotes growth and/or production of the horticultural or agricultural crop.

Another non-limiting embodiment includes a composition comprising a first component and a second component. The first component and the second component are each independently selected from the group consisting of a lysine product, a cell broth, a protein, a by-product generated at an agricultural product processing facility, and combinations of any thereof, the first component and the second component being different.

Other non-limiting embodiments include methods comprising applying a granular, nitrogen containing material selected from the group consisting of soy powder, soybean meal, soy flakes, soy flour, a cell mass obtained from a threonine fermentation, a cell mass obtained from a lysine fermentation, a cell mass obtained from a citric acid fermentation, a cell mass obtained from a polyhydroxyalkanoate isolation process, a cell mass obtained from an ethanol fermentation, and any combinations thereof to a plant.

Still other non-limiting embodiments include methods of spreading a granular lysine product comprising at least 50% lysine and between 8% and 20% by weight nitrogen on a plant at a rate of between 0.56 kilogram per acres and 16.83 kilogram per acres. Other non-limiting embodiments include methods of spraying a plant with a solution comprising an aqueous liquid lysine product comprising at least 50% lysine and between 8% and 20% by weight nitrogen on a plant at a rate of between 0.025 liter per acres and 98.84 liters per acres,

BRIEF DESCRIPTION OF THE DRAWINGS

The various non-limiting embodiments of the present disclosure may be better understood when read in conjunction with the following figures.

DETAILED DESCRIPTION

Figure 1:
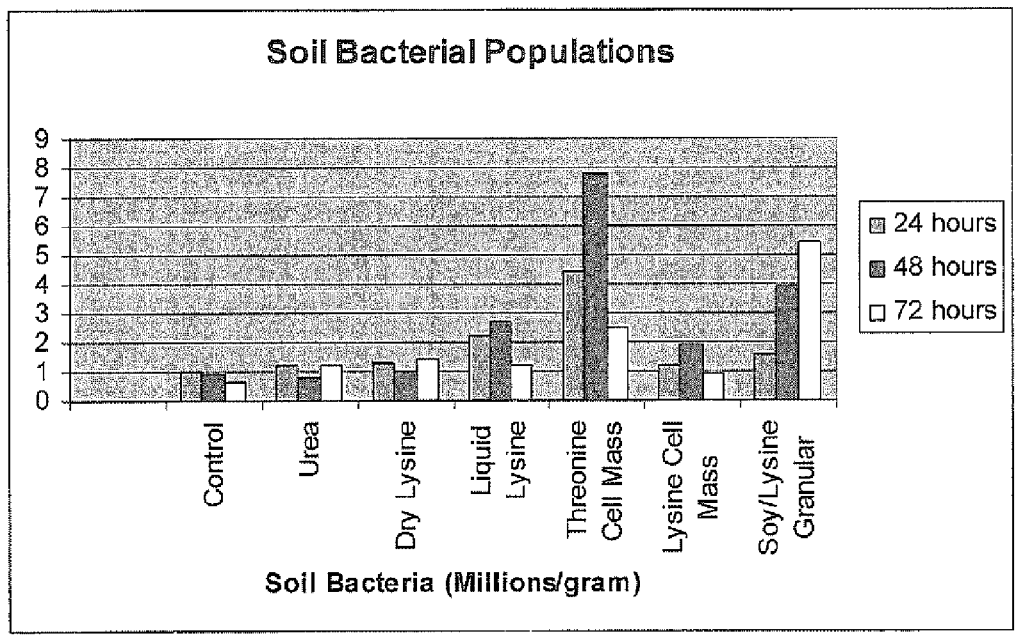
FIG. 1 illustrates the effect on soil microbial population after application of various fertilizer compositions described herein.

Various non-limiting embodiments of the present disclosure present a fertilizer composition comprising one or more organic compounds with a high nitrogen content. Methods of increasing the nitrogen content of soil, methods of promoting crop production and methods of fertilizing horticultural and agricultural crops are also described.

Other than in the operating examples, or where otherwise indicated, all nubers recited herein expressing quantities of ingredients, reaction conditions and the like are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Also, unless denoted otherwise, percentages of components in a composition are presented as weight percent.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure describes several different features and aspects of the invention with reference to various exemplary non-limiting embodiments. It is understood, however, that the invention embraces numerous alternative embodiments, which may be accomplished by combining any of the different features, aspects, and embodiments described herein in any combination that one of ordinary skill in the art would find useful.

Various non-limiting embodiments of the present disclosure are directed toward a fertilizer composition comprising one or more organic compounds. According to certain non-limiting embodiments, the one or more compounds may have a high nitrogen content as measured by a C to N ratio. As used herein, the term "organic compound with a high nitrogen content" includes a compound with a molecular structure made up of primarily a carbon skeleton where the number of nitrogen atoms relative to the number of carbon atoms is high. The number of nitrogen atoms relative to the number of carbon atoms may be represented by a carbon atom to nitrogen atom ratio in the molecular structure of the compound or the makeup of the composition (C to N ratio).

According to certain non-limiting embodiments, the C to N ratio of the organic compounds of the present disclosure may range from 1:1 up to about 12:1, that is, the molecular formulae of the organic compounds may have from 1 carbon to every 1 nitrogen, up to 12 carbons for every 1 nitrogen.

According to other non-limiting embodiments, the C to N ratio of the organic compounds of the present disclosure may range from 1:1 up to about 8:1. Alternatively, the nitrogen content may be measured by a weight percentage of nitrogen in the one or more organic compound.

According to certain non-limiting embodiments, the fertilizer of the present disclosure comprises one or more organic compounds having greater than 5% nitrogen by weight, for example, ranging from about 5% to about 20% nitrogen. According to other non-limiting embodiments, the fertilizer may comprise one or more organic compounds having from about 8% to about 20% by weight of nitrogen. According to other non-limiting embodiments, the fertilizer may comprise one or more organic compounds having greater than 10% nitrogen, for example, ranging from about 10% to about 20% nitrogen.

Fertilizers may be designated by the content of one or more of the following components: nitrogen, phosphorous, and potassium. The content of these elements in a fertilizer may be indicated by the N—P—K value (where N=nitrogen content by weight percentage, P=phosphorous content by weight percentage, and K=potassium content by weight percentage). According to certain non-limiting embodiments, the fertilizer of the present disclosure comprising one or more compounds may have an N component of the N—P—K value ranging from 5 to 20. According to other non-limiting embodiments, the N component of the N—P—K value of the fertilizer may range from 8 to 20. According to still other non-limiting embodiments, the N component of the N—P—K value of the fertilizer may range from 10 to 20.

According to other embodiments, the present disclosure provides for a soil amendment comprising one or more organic compounds or compositions as described herein. According to certain non-limiting embodiments, the soil amendment comprising the one or more organic compounds or compositions may comprise less than 8% nitrogen, by weight, for example, from about 2% nitrogen, by weight to about 5% nitrogen by weight.

Fertilizers, according to the various embodiments of the present disclosure, may be applied to soil or agricultural or horticultural crops in an amount that promotes plant growth, promote growth of beneficial soil microbes, and/or replenishes various nutrients that may have been depleted from the soil, for example, as a result of repeated planting cycles or that may have been depleted by leaching. Alternatively, the fertilizers may be applied to soils having low or insufficient nutrient levels and/or soil microbe levels to support efficient agricultural production of crops, such as, for example, land that is currently unsuitable for farming or crop production.

In other non-limiting embodiments, the fertilizers of the present disclosure may promote growth of a plant in a hydroponic or aeroponic system.

As used herein, the term "crop" includes, but is not limited to, any agricultural or horticultural plant grown to satisfy a need, such as for food, aesthetics, industrial use, athletic use (i.e., performance of an athletic event thereon, for example, on turf grass), and sale. Non-limiting examples of potential "crops" to which the fertilizer compositions of the present invention may be applied to include, but are not limited to, fruits, vegetables, roots and tubers, grains, flowers and other horticultural products, trees, shrubs, turf grass and sod, houseplants, and industrial crops, such as corn, wheat, barley, sunflowers, canola, flax, borage, legumes, sugar beets, and soybeans for the production of industrial and food products.

According to certain non-limiting embodiments of the present disclosure, the one or more organic compounds may comprise a lysine product, a fermentation cell broth, an ammonium salt of an organic acid, an amidated organic carboxylic acid, products and/or by-products generated at an agricultural product processing facility, and a protein, such as a plant derived protein, a bacterial or microbe derived protein, or an animal derived protein, or mixture of any thereof. According to certain non-limiting embodiments, the protein may be substantially soluble in an aqueous solution. According to other non-limiting embodiments, the protein may be substantially insoluble in an aqueous solution.

According to certain non-limiting embodiments, the fertilizers of the present disclosure may have a solid granular or agglomerated formulation. According to certain non-limiting embodiments, the granular or agglomerated formulation may have a mesh size of at least 5 (i.e., the particles would have a size of about 4 mix or smaller). According to other non-limiting embodiments, the mesh size may be from about 10 mesh to about 5 mesh (i.e., the particle size would range from about 2 mm to about 4 mm). Pellet size may be coarse (over 200 size guide number (SGN)) by certain industry standards, but smaller pellet size may equate to a larger surface area which may allow for more extensive and rapid soil microbial activities and release of nutrients. According to various embodiments where the fertilizer has a solid formulation, the fertilizer may be at least substantially soluble in water at a temperature from 32° F. to 140° F.

In another non-limiting embodiment, the fertilizer may be admixed with a surfactant, an emulsifier, an antifoaming agent, and/or a dispersant for enabling the fertilizer to disperse in a solution. In one non-limiting embodiment, the surfactant may include, but is not limited to, agricultural surfactants, such as, anionic surfactants, cationic surfactants, a non-ionic surfactant, amphoteric surfactants, silicone-based surfactants, alcohol based surfactants, and combinations of any thereof. Suitable surfactants include, but are not limited to, lecithin.

According to other non-limiting embodiments, the fertilizer of the present disclosure may have an aqueous homogeneous solution or an aqueous heterogeneous suspension formulation. For example, when the one or more organic compounds of the fertilizer, as defined herein, comprises a water soluble salt of the one or more organic compounds, such as, for example, lysine monohydrochloride ("lysine (HCl)"), lysine sulfate, or other soluble lysine salt, or an ammonium salt of an organic acid, and the water soluble salt may be substantially dissolved into an aqueous solution prior to dispersion and application to the soil or plant. Alternatively, the soluble lysine salt may be in the form of an aqueous mother liquor from a lysine crystallization/isolation process, for example a crystallization of lysine (HCl). According to certain embodiments, an aqueous mother liquor may comprise an aqueous solution of from about 20% to about 25% by weight of lysine. Alternatively, the one or more organic compound of the fertilizer compositions may comprise lysine free base, which may be substantially soluble in water and form an aqueous homogeneous solution. Alternatively, the organic compound(s), such as, in one non-limiting example, a fermentation cell broth, may comprise an aqueous heterogeneous suspension which may be sprayed or otherwise dispersed onto the soil or plant.

According to certain non-limiting embodiments, the fertilizer of the present disclosure may comprise one or more organic compounds comprising one or more lysine products.

As used herein, the term "lysine product" includes a product comprising the amino acid lysine ($C_6H_{14}N_2O_2$) and salts or derivatives thereof, and the term "lysine" includes all isomers of lysine (i.e., L-lysine, D-lysine, and any mixture of L- and D-lysine). Lysine has a C to N ratio of 3:1. The lysine products according to various non-limiting embodiments may comprise a nitrogen content ranging from about 9% N to about 20% N, depending of the formulation. In certain embodiments, the nitrogen content of the lysine products may range from about 9% N to about 15% N.

Various non-limiting examples of lysine products suitable for use in the present disclosure include, but are not limited to, water soluble salts of lysine, such as, for example, lysine monohydrochloride ("lysine (HCl)"), lysine hydrate, lysine dihydrochloride, and lysine sulfate; lysine free-base; aqueous solutions of lysine free-base; granular lysine; lysine cell waste; lysine cell mass; lysine raffinate; a lysine mother liquor, or mixtures of any thereof.

According to certain non-limiting embodiments, the aqueous solution of lysine free-base may comprise LIQUID LYSINE™ brand lysine (a trademark of and product commercially available from Archer Daniels Midland Co. of Decatur, Ill.). According to other non-limiting embodiments, the aqueous solution of lysine free-base may comprise an aqueous solution comprising from about 5% by weight to about 95% by weight of lysine free-base. According to other non-limiting embodiments, the aqueous solution of lysine free-base may comprise an aqueous solution comprising from about 15% by weight to about 85% by weight of lysine free-base. According to still other non-limiting embodiments, the aqueous solution of lysine free-base may comprise an aqueous solution comprising from about 25% by weight to about 75% by weight of lysine free-base. According to other non-limiting embodiments, the aqueous solution of lysine free-base may comprise an aqueous solution comprising from about 35% by weight to about 65% by weight of lysine free-base. According to other non-limiting embodiments, the aqueous solution of lysine free-base may comprise an aqueous solution comprising from about 45% by weight to about 55% by weight of lysine free-base. In other non-limiting embodiments, the lysine content of the aqueous solution of lysine free-base may be increased as desired by either removal or lowering the amount of water in the solution or by the addition of an additional lysine product, such as a soluble salt of lysine, for example, lysine HCl and/or lysine sulfate. Alternatively, according to other non-limiting embodiments, the lysine content of the aqueous solution of lysine free-base may be decreased as desired by the addition of water to the solution.

Lysine monohydrochloride (HCl) is commercially available in the form of L-lysine (HCl) (commercially available from Archer-Daniels-Midland Company, Decatur, Ill.). L-lysine (HCl) may be obtained from, for example, but not limited to, purifying the product of a lysine fermentation process by crystallization of the hydrochloride salt.

It is also contemplated that other amino acids may be suitable for use as the one or more organic compounds in the present disclosure. For example, the non-limiting embodiments of the present disclosure may include a fertilizer composition comprising an amino acid product selected from the group consisting of an arginine product, a methionine product, a threonine product, and combinations of any thereof. The amino acid products may include water soluble salts of the amino acid, free-bases of the amino acids, aqueous solutions of the amino acid salt and/or free-base, and combinations of any thereof Fertilizer compositions comprising other naturally occurring amino acids are also contemplated.

According to certain non-limiting embodiments, the fertilizer composition of the present disclosure may comprise one or more organic compounds comprising a lysine product selected from the group consisting of a water soluble salt of lysine including, but not limited to, a mono-potassium phosphate salt of lysine; lysine (HCl); lysine free-base; liquid lysine; lysine dihydrochloride; and lysine sulfate and mixtures of any lysine product. Lysine (HCl) has a nitrogen content of about 15% by weight. Lysine sulfate has a nitrogen content of about 10% by weight. Lysine free base has a nitrogen content of about 19-20% by weight on a pure basis, which corresponds to about 9.5-10% nitrogen for the 50% aqueous solution in LIQUID LYSINE brand lysine. Aqueous solutions of lysine free-base having a nitrogen content from about 1% to 19% by weight (i.e., from 5% to 95% by weight of lysine free-base) may be prepared as described herein and utilized in certain non-limiting embodiments of the compositions disclosed herein. Lysine free-base and lysine salts, such as lysine (HCl), lysine sulfate, potassium phosphate salts of lysine and the like, are generally soluble in aqueous solutions and may be applied to soil or plants by dissolving the lysine salt in an aqueous solution followed by application of a sufficient volume of the solution to the soil and/or plant to yield the desired amount of nitrogen. Solutions of lysine product may be applied directly to the plant, for example, as a foliar spray or may be applied to the soil by spraying the solution onto the soil in a desired amount. Alternatively, the lysine salts, as described herein, may be applied to the soil and/or plant in a solid, granular, or powdered form, such application may be followed by watering (i.e., by irrigation, rain fall, etc.) to disperse the lysine product into the soil for microbial breakdown.

According to certain non-limiting embodiments of the present disclosure, the organic compound comprises lysine (HCl) and the fertilizer composition may be applied to a soil in an amount of about 50 pounds per acre (lbs/acre) to about 1500 lbs/per acre. According to other non-limiting embodiments, where the organic compound comprises LIQUID LYSINE brand lysine (50% lysine free base aqueous solution), the fertilizer composition may be applied to the soil in a concentrated form in an amount of about 1.0 liters per acre (L/acre) to about 496 L/acre. According to other non-limiting embodiments, the fertilizer composition comprising LIQUID LYSINE brand lysine is applied in an amount of about 1.0 L/acre to about 350 L/acre. According to other non-limiting embodiments, the fertilizer composition comprising LIQUID LYSINE brand lysine is applied in an amount of about 165 L/acre to about 496 L/acre. According to still other non-limiting embodiments, the fertilizer composition comprising LIQUID LYSINE brand lysine may be diluted with water prior to applying to the soil.

According to other non-limiting embodiments, the fertilizers disclosed herein may be applied to a plant, such as turf grass, or soil containing such a plant in amount measured by the weight of nitrogen (as calculated by the N component from the N—P—K value) per unit area per unit time. For example, according to one non-limiting embodiment, the fertilizers may be applied in an amount from 0.0625 lb nitrogen/1000 $ft^2$/2 weeks to 0.375 lb nitrogen/1000 $ft^2$/2 weeks. According to another non-limiting embodiment, the fertilizer may be applied in an amount from 0.25 lb nitrogen/1000 $ft^2$/month to 3.0 lb nitrogen/1000 $ft^2$/month, According to still other non-limiting embodiments, the fertilizers may be applied in an amount from 0.5 lb nitrogen/1000 $ft^2$/year to 8.0 lb nitrogen/1000 $ft^2$/year.

According to certain non-limiting embodiments, the fertilizer of the present disclosure may comprise one or more organic compounds comprising a fermentation cell broth, products from a fermentation process, and/or by-products from a downstream recovery process of a fermentation process. As used herein, the term "fermentation cell broth" includes products generated from a fermentation process, such as, but not limited to, an alcohol, such as, for example, ethanol; an organic acid, such as, for example, lactic acid; an ester of an organic acid, such as, for example, lactate esters; an amino acid, such as lysine or threonine; a fungal, or a bacterial fermentation. The broth may comprise the mycelium, the cell mass, or the biomass of a yeast or fungal fermentation and the media on or in which it was grown and may comprise the enzyme system of the viable organism and its concomitant metabolites and other products produced during the fermentation process and not removed during one or more separation processes. The broth may further or alternatively comprise a bacterial fermentation mass, such as, for example, a cell mass or a biomass, and the media on or in which it was grown and may comprise the enzyme system of the viable organism and its concomitant metabolites produced during the fermentation process and not removed during the one or more separation processes.

According to one non-limiting embodiment, the fermentation cell broth may be an alcohol fermentation broth, such as an ethanol fermentation broth utilizing a yeast as the fermentation medium. Suitable alcohol fermentation yeast varieties include brewer's yeast, baker's yeast and other strains of *Saccharomyces*, such as, *Saccharomyces cerevisiae*.

In yet a further non-limiting embodiment, the fertilizer may comprise a hydrolysate of an industrial cell mass used for fermentation. For instance, after hydrolysis with an acid (e.g., sulfuric acid or hydrochloric acid), the hydrolysate may be neutralized with a base suitable for the acid used, thus producing an approximately neutral pH slurry containing the hydrolyzed material and precipitated salts. The slurry may be directly applied to the soil and/or plants growing therein, or may be dried to a granular produce, such as, by conversion to prills, and, optionally, combined with other soil nutrients and/or carriers. The selection of the acid and base may be done depending on the desired composition of the organic fertilizer. For instance, in one embodiment, if a potassium and/or sulfate enriched fertilizer composition is desired sulfuric acid may be used for hydrolysis followed by neutralization with a base having a potassium counteraction, such as, for example, potassium hydroxide. It is expected that the hydrolyzed and neutralized cell mass would be more bioavailable to a plant or inicroflora in the soil and may be used at a lower rate than un-hydrolyzed cell masses, thus resulting in the production of healthy plants.

According to certain non-limiting embodiments, the fertilizer of the present disclosure may comprise one or more organic compounds comprising a fermentation cell broth or fermentation cell mass selected from the group consisting of a lysine fermentation cell broth or cell mass and a threonine fermentation cell broth or cell mass or combinations of any thereof. According to other non-limiting embodiments, the fermentation cell broth may comprise at least one of a dried cell broth, for example, a fermentation broth that has been dried, such as, by spray drying; a cell mass or biomass, for example, a cell mass having approximately 50% protein by weight; and a biomass. The fermentation cell broth may be in the form of a powder, a granulated pellet, a heterogeneous slurry, for example an aqueous slurry of the cell broth, or combinations of any thereof. The fermentation cell broth may be applied to the soil or plant in dry form (i.e., as a powder or pellet) followed by watering (for example, by irrigation or rain fall), or may be applied by mixing a dried cell broth pellets or powder in water and, optionally preventing settling, applied directly to the soil or plant by a spray system or a simple watering can.

Figure 8:
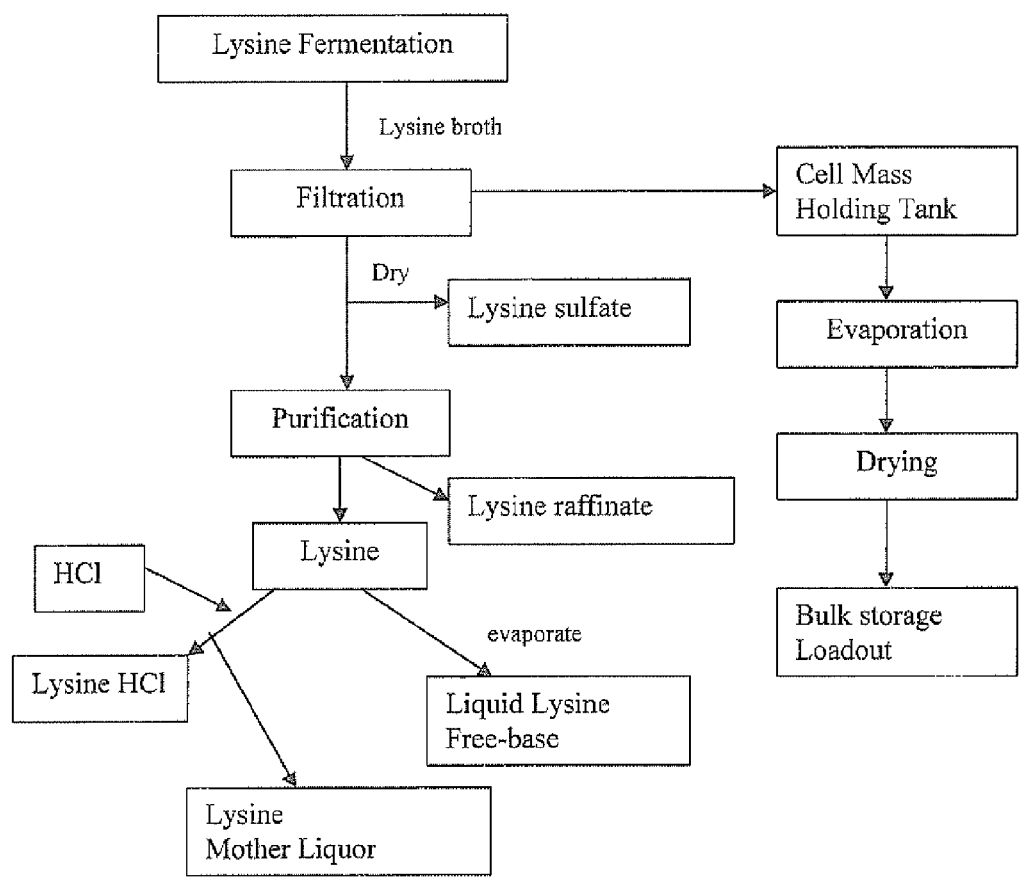
FIG. 8 illustrates a lysine fermentation process.

According to certain non-limiting embodiments where the one or more compound comprises a lysine cell broth, the lysine cell broth may comprise a nitrogen content ranging from about 8% to about 15%. According to other non-limiting embodiments, the nitrogen content of the lysine cell broth may range from about 10% to about 15%. According to other non-limiting embodiments, the nitrogen content of the lysine cell broth may be about 11% to about 12%. The lysine cell broth may comprise lysine sulfate (approximately 50% by weight) and may have a crude protein content of 75.0% by weight. One non-limiting embodiment of a lysine fermentation process is set forth in FIG. 8. Lysine products, such as, lysine sulfate, lysine free-base, lysine HCl, lysine cell mass, aqueous lysine free-base (including LIQUID LYSINE), and lysine mother liquor may be produced and isolated from a lysine cell broth and utilized as a lysine product in various non-limiting embodiments of the present disclosure.

Figure 9:
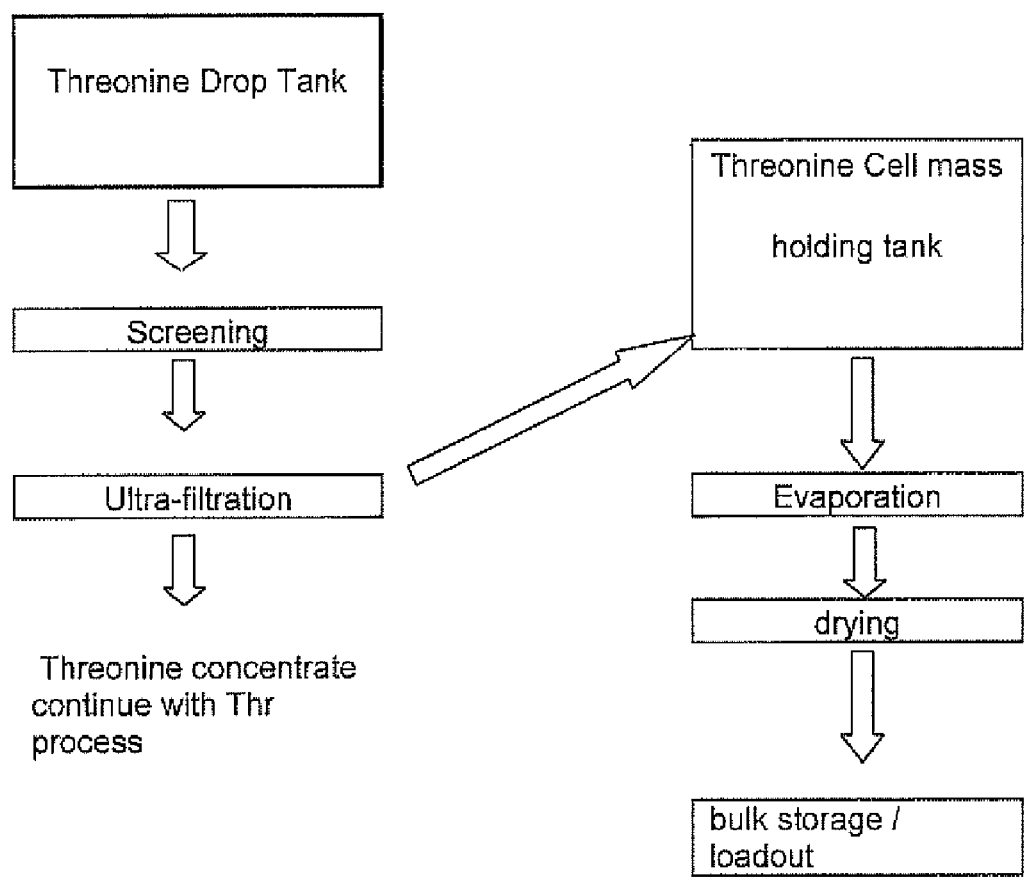
FIG. 9 illustrates a threonine fermentation process.

According to other non-limiting embodiments where the one or more compound comprises a threonine cell broth or cell mass, the threonine cell broth or cell mass may comprise a nitrogen content ranging from about 7% to about 15%. According to other non-limiting embodiments, the nitrogen content of the threonine cell broth or cell mass may be about 10% to about 15%. According to other non-limiting embodiments, the nitrogen content of the threonine cell broth or cell mass may be about 10% to about 13%. One non-limiting embodiment of a threonine fermentation process is set forth in FIG. 9.

Figure 10:
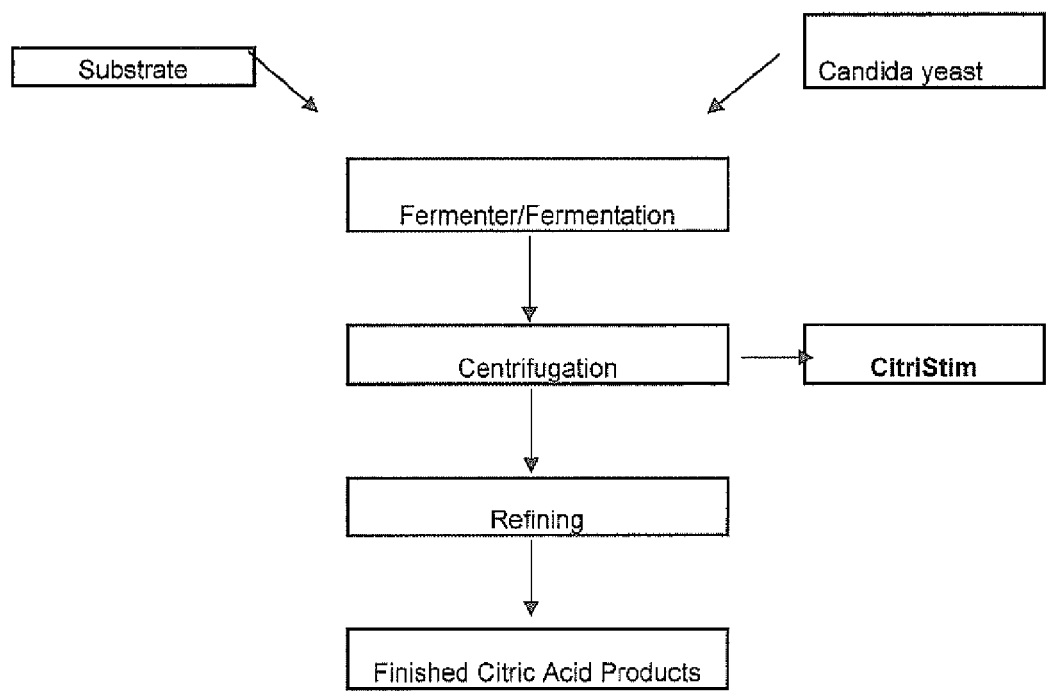
FIG. 10 illustrates a citric acid fermentation process.

According to other non-limiting embodiments, the fertilizer may comprise a by-product from an organic acid fermentation or other fermentation process. For example, a by-product from a citric acid fermentation process comprising calcium sulfate as well as various organic compounds, such as citric acid, may serve as a source of sulfur in the organic fertilizer. According to one non-limiting embodiment, the by-product from a citric acid fermentation process may comprise CitriStim® brand citric acid fermentation culture (commercially available from Archer-Daniels-Midland Company, Decatur, Ill.). Citristim® is a by-product of a citric acid fermentation process using a Candida yeast on a carbohydrate substrate under controlled and aerobic conditions. Citristim® is a granular product having a nitrogen content of about 6.4% by weight. One non-limiting embodiment of a Citristim® production process is set forth in FIG. 10. Other organic acid fermentation by-products may be obtained from, for example, lactic acid fermentation, formic acid fermentation, acetic acid fermentation, propionic acid fermentation, butanoic acid fermentation, oxalic acid fermentation, malic acid fermentation, succinic acid fermentation, fumaric acid fermentation, ascorbic acid fermentation, tartaric acid fermentation, glucono delta-lactone fermentations, and combinations of any thereof.

In yet farther non-limiting embodiments, the fertilizer may comprise products and/or by-products generated at an agricultural product processing facility including, but not limited to, settling pond waste obtained from a settling pond of a waste water treatment facility or lagoon; a dextrin; a maltodextrin; corn syrup; soy molasses; granulated steepwater; phytic acid precipitate from stillage; ethanol yeast; corn germ meal; a high pH mixture of sorbitol and ferrous sulfide; an acid, including, but not limited to, phosphoric acid; modified B-starch; calcium or magnesium lysinate; dried distillers grain (DDG); lysine or ammonium phytate and potassium chloride; a sugar and amino acid Malliard reaction product; a lysine free base in combination with sorbitol and ferrous sulfide; molasses; a by-product of a polyhydroxyalkanoate (PHA) production process (such as, a biomass from a PHA isolation process), and combinations of any thereof.

According to certain non-limiting embodiments, the fertilizer of the present disclosure may comprise one or more organic compounds comprising an ammonium salt of an organic acid. As used herein, the term "ammonium salt of an organic acid" includes the ionic chemical product produced when the acidic hydrogen of an organic acid, such as, for example, a carboxylic acid, or a sulfonic acid, is reacted with a basic ammonium ion source, such as, for example, ammonium hydroxide ($NH_4OH$). The resultant ionic salt has one or more negatively charged oxygens and an equal number of positively charged ammonium ions ($NH_4^+$) associated by ionic attractions between the oppositely charged ions. Organic acids suitable for use according to certain non-limiting embodiments may include, but are not limited to, lactic acid, citric acid, formic acid, acetic acid, propionic acid, butanoic acid, oxalic acid, malic acid, succinic acid, fumaric acid, ascorbic acid, tartaric acid, glucono delta-lactone, or mixtures of any thereof. By forming the ammonium salt of the organic acid, the nitrogen content of the organic compound may be increased. The resulting ammonium salt of the acids according to certain non-limiting embodiments may include ammonium lactate, ammonium citrate, ammonium formate, ammonium acetate, ammonium propionate, ammonium butanoate, ammonium oxylate, ammonium malate, ammonium succinate, ammonium fumarate, ammonium ascorbate, and ammonium tartrate or any mixtures thereof According to certain non-limiting embodiments where the organic acid comprises two, three, or multiple acid functional groups; one, two, three, or up to all of the acidic functional groups in the organic acid may be reacted to form one or more ammonium salts, as defined above, and the term ammonium salt of an organic acid includes all possible combinations of ammonium salts for each organic acid. For example, citric acid has three carboxylic acid functional groups. According to certain non-limiting embodiments where the organic acid is citric acid, the ammonium salt of an organic acid may be the mono-ammonium salt, the di-ammonium salt or the tri-ammonium salt of citric acid, or various mixtures of the mono-, di- and tri-ammonium salts.

According to certain non-limiting embodiments, the fertilizer of the present disclosure may comprise one or more organic compounds comprising an amidated organic carboxylic acid. As used herein, the term "amidated organic carboxylic acid" includes an organic compound having a carboxylic acid functionality that has been converted by a chemical reaction, to an amide functionality. By forming the amide of the carboxylic acid, the nitrogen content of the organic compound may be increased. According to certain non-limiting embodiments, the amide of the organic carboxylic acid may be an unsubstituted amide, a mono-substituted amide, and a di-substituted amide, where each substitution may independently be an alkyl group, such as an alkyl group having from 1 to 6 carbon atoms, or an aromatic group. Organic carboxylic acids suitable for use according to certain non-limiting embodiments may include, but are riot limited to, organic acids, such as, for example, lactic acid, citric acid, ascorbic acid, tartaric acid, and natural and non-natural amino acids, including, for example any of the essential amino acids, such as, for example, glycine, alanine, serine, valine, lysine, asparagines, glutamine, histadine, arginine, methionine, and threonine, any non-essential amino acid, or any mixture of these organic carboxylic acids. In certain non-limiting embodiments where the organic compound comprises an amide of an essential amino acid, the amide is formed at the carboxylic acid of the amino acid. According to certain non-limiting embodiments where the organic carboxylic acid comprises an organic compound having multiple carboxylic acid functional groups, one or more, including up to all of the carboxylic acid functional groups may have been converted to an amide functional group. For example, where the organic carboxylic acid is citric acid, the amidated organic carboxylic acid may comprise a mono-amide of citric acid, a di-amide of citric acid, or a tri-amide of citric acid, or various mixtures of the mono-, di- and tri-amides of citric acid.

According to certain non-limiting embodiments, the fertilizer of the present disclosure may comprise one or more organic compounds comprising a plant protein. According to certain non-limiting embodiments, the plant protein may be isolated by an extraction process and/or a pressing process. According to the various non-limiting embodiments, the extraction process may comprise an extraction of soluble proteins followed by a precipitation step to yield an isolated soluble protein material; or an extraction of soluble non-protein compounds, such as, for example, oils and sugars, to yield plant protein concentrates, which may include less soluble plant fiber material.

According to certain non-limiting embodiments, the plant protein may comprise soy protein isolates, which in certain embodiments may be blended with a basic salt; oilseed protein isolates, such as, for example, canola protein isolates; soy protein concentrates, including, but not limited to, ARCON® brand soy concentrates (commercially available from Archer-Daniels-Midland Company, Decatur, Ill.); reverse soy concentrates; soy flour; soy flakes; soy meal; soy protein isolates, such as, but not limited to, ARDEX® brand soy protein isolates (commercially available from Archer-Daniels-Midland Company, Decatur, Ill.); and various mixtures of any thereof Soy protein isolates may be produced, for example, by removing proteinaceous material from dehulled and defatted soybean material, such as soybean flakes, by extraction with water or aqueous alkali solution. Soy protein isolates are typically sparingly soluble in water of neutral pH (i.e., pH approximately 7), but soluble at pH's of greater than 8. Therefore, according to certain non-limiting embodiments, the soy protein isolates are blended with a sufficient quantity of a basic salt such that an aqueous solution of the soy protein isolates blended with the basic salt has a pH of greater than 8. In certain non-limiting embodiments where the pH is greater than 8, the soy protein isolates are substantially dissolved in the aqueous solution.

According to various non-limiting embodiments, the fertilizer may comprise a lysine product and a plant protein, such as any of the plant proteins described herein. According to these non-limiting embodiments, the lysine product may be a lysine salt, such as, lysine (HCl), lysine sulfate, a potassium phosphate salt of lysine, or combinations of any thereof, alternatively, the lysine product may comprise LIQUID LYSINE. According to the various non-limiting embodiments, the plant protein may comprise soy protein isolates, which in certain embodiments may be blended with a basic salt; oilseed protein isolates, such as, for example, canola protein isolates; soy protein concentrates, including, hut not limited to, ARCON® brand soy concentrates (commercially available from Archer-Daniels Midland Company, Decatur, Ill.); reverse soy concentrates; soy flour; soy flakes; soy meal; soy protein isolates, such as, but not limited to ARDEX® brand soy protein isolates (commercially available from Archer-Daniels-Midland Company, Decatur, Ill.); and various mixtures of any thereof.

In other non-limiting embodiments, organic compositions may be obtained from processes used to produce concentrates or isolates from other protein sources including, but not limited to, corn; wheat, barley; oil seeds, including, but not limited to, soy, rapeseed (canola), sunflower, safflower, peanut, cottonseed, oil palm, palm kernel, and others; and combinations of any thereof. The protein sources may also include products, by-products, and/or waste streams of processing of these protein sources, such as, corn gluten feed (CGF); dried distiller grains (DDG); "red dog" (high ash cuts from flour milling), glutens; defatted oilmeals, such as, for example, oilmeals obtained from solvent arid/or mechanical deoiling processes; malt sprouts, including, but not limited to, barley, wheat or rye; or other fractions containing protein which are the result of separation processes used in processing these protein sources.

According to other non-limiting embodiments, the fertilizer may comprise a lysine product, as described herein, and a fermentation biomass, as described herein. In one non-limiting embodiment, the fertilizer may comprise a threonine fermentation biomass or cell mass and a lysine product, such as, for example, a soluble lysine salt and/or LIQUID LYSINE. According to another non-limiting embodiment, the fertilizer may comprise a lysine fermentation biomass or cell mass and a lysine produce, such as, for example, a soluble lysine salt and/or LIQUID LYSINE. In still other non-limiting embodiments, the fertilizer may comprise a fermentation biomass, such as a threonine fermentation biomass and/or a lysine fermentation biomass, and a plant protein, as described herein. According to yet another non-limiting embodiment, the fertilizer may comprise a lysine product, a fermentation biomass, and a plant protein. The fertilizer comprising a lysine product and at least one of a fermentation biomass and a plant protein may be applied to a soil or a plant in a soil at a rate of from about 0.25 lb N/1000 ft$^2$/month to about 5.0 lb N/1000 ft$^2$/month.

According to one non-limiting embodiment, the fertilizer composition of the present disclosure may comprise from about 20% to about 100% of a lysine product; 0% to about 50% of a fermentation broth or cell mass; and 0% to about 50% of a plant protein. According to another non-limiting embodiment, the fertilizer composition may comprise from about 30% to about 50% of a lysine product; about 15% to about 35% of a fermentation broth or cell mass; and about 15% to about 35% of a plant protein. According to still other non-limiting embodiments, the fertilizer composition may comprise from about 80% to 100% of a lysine product.

The fertilizer comprising a lysine product and a plant protein and/or fermentation biomass may provide the combination of rapid microbial breakdown and plant response along with prolonged microbial activity. While not intending to be limited by any particular theory, it is believed that the lysine product may be readily broken down by soil microbes within 72 hours, providing rapid access to the microbial breakdown products and nitrogen and rapid plant response, whereas the soluble plant protein and/or fermentation biomass may be broken down more slowly (i.e., slow release, over 1 week to 1 month) providing a long term microbial response and long term increase in desired microbial populations.

The fertilizers of the present disclosure may optionally comprise additional ingredients, such as, additional soluble salts, for example, soluble salts of potassium and/or phosphorus; products and/or byproducts generated at an agricultural product processing facility, for example, molasses or a fermentation biomass (as described herein); or synthetic organic nitrogen containing compounds, such as, for example, isobutylidene diurea ("IBDU"). According to various non-limiting embodiments, the fertilizers of the present disclosure may comprise from about 10% to about 25% by weight of potassium and/or from about 5% to about 10% by weight of phosphorous. It should be noted that addition of potassium and/or phosphorous may dilute and lower the levels of nitrogen in the organic fertilizers. If this is the case, the reduction in nitrogen content may be countered by the addition of a component having a high nitrogen content, such as, for example, granular lysine (i.e., a soluble salt of lysine), LIQUID LYSINE, urea, and/or IBDU. Alternatively, an inorganic nitrogen source may be added to the fertilizer to increase the nitrogen content.

Non-limiting examples of basic salts, suitable for use in the present disclosure include, but are not limited to, basic salts of carbonate ions ($CO_3^{2-}$), bicarbonate ions ($HCO_3^-$), hydroxide ($OH^-$), nitrate ions ($NO_3^-$), oxide ions ($O_2^-$), hydrophosphite ions ($HPO_3^{2-}$), dihydrophosphite ions ($H_2PO_3^-$), phosphite ions ($PO_3^{3-}$), hydrophosphate ions ($HPO_4^{2-}$), dihydrophosphate ions ($H_2PO_4^-$), and phosphate ions ($PO_4^{3-}$) or any combination of basic salts containing these anions. For example, the basic salts may include the alkali earth metal salts of these anions and in particular, the potassium salts of these anions, such as $K_2CO_3$, $KHCO_3$, $KOH$, $KNO_3$, $K_2O$, $K_2HPO_3$, $KH_2PO_3$, $K_3PO_3$, $K_2HPO_4$, $KH_2PO_4$, or $K_3PO_4$, or combinations any of these potassium salts or combinations with other basic salts. According to other non-limiting embodiments, the basic salt may be an ammonium salt of the anions listed above, for example, $(NH_4)_2CO_3$, $(NH_4)HCO_3$, $NH_4OH$, $NH_4NO_3$, $(NH_4)_2O$, $(NH_4)_2HPO_3$, $(NH_4)H_2PO_3$, $(NH_4)_3PO_3$, $NH_4)_2HPO_4$, $(NH_4)H_2PO_4$, or $(NH_4)_3PO_4$, or combinations of any these ammonium salts or combinations with other basic salts.

According to certain non-limiting embodiments of the present disclosure, the one or more organic compounds of the fertilizer composition comprises a solid. According to certain non-limiting embodiments, the fertilizer composition may further comprise a coating on at least a portion of a surface of the solid organic compound. The coating may slowly degrade upon exposure to enviromnental or biological conditions, such as, but not limited to, degradation by soil bacterial, soil microbes or microorganisms; dissolution by water; and/or degradation by ultraviolet light or other wavelengths of electromagnetic radiation. As the coating degrades, the organic compound of the fertilizer becomes exposed to environmental conditions where it may be further broken down into simpler structures and absorbed by the plants. While, as mentioned above, organic fertilizers typically provide for slower release of nutrients due to the requirement that the compounds be broken down by soil microorganisms, the utilization of a coating may provide for even slower and/or controlled release of nutrients. This may be beneficial for certain embodiments of the fertilizer, for example, where the fertilizer comprises certain inorganic fertilizer components or where the fertilizer is applied to the soil at the end of the growing season, thereby providing nutrients to the soil over the winter months or while the field and soil lies fallow. According to certain non-limiting embodiments, the coating may comprise poly(hydroxyalkanoate) ("PHA"). Alternatively, as described herein, the fertilizer may comprise a by-product or residue of a PHA isolation process, for example, the residue remaining from the extraction of PHA from a fermentation broth of a bacteria or an extraction from a plant fiber, such as corn stover.

According to other non-limiting embodiments, the fertilizer composition may comprise a binder material. The binder material may be used, for example, where the fertilizer component compound(s) comprise a powder or fine particulate material that may be bound together with the binder material to form larger; coarse particulate material that may be more suited for application to soil, crops, or horticultural commodities. Use of a binder material may be desirable, because the binder material will substantially dissolve in response to irrigation and/or rainfall, resulting in dispersal of the organic compound(s) into the soil. As a powder or fine particulate, for example, after dissolution of the binder material, the compounds may possess greater available surface area for microbial attack, potentially leading to efficient break-down of the compound into nutrient components. Suitable binder material may comprise soy molasses, corn syrup, soy protein liquor, corn steep liquor, and/or distiller's solubles or various combinations thereof Other suitable binder materials may comprise products from milling processes, such as B-starch from a wheat milling process; other starch and starch-derived products; and various products from corn, grain or oilseed processing that may possess binding properties and are at least partially soluble in water.

According to other non-limiting embodiments, the fertilizer composition may further comprise at least one inorganic fertilizer component. As described above, inorganic fertilizers are manufactured from non-living materials and are readily soluble and absorbed by plants. The fertilizer composition that may also comprise inorganic fertilizer components may allow for a fertilizer product that provides both immediate nutrient availability from the inorganic fertilizer components and long-term, slow release, nutrient availability by microbial breakdown of organic fertilizer components, such as organic compounds with a high nitrogen content. Such a fertilizer composition may provide for less frequent application of fertilizer to the soils thereby providing economic benefit along with the environmental benefits associated with the use of organic fertilizers. Suitable inorganic fertilizer components according to certain non-limiting embodiments, include, but are not limited to, potassium salts, such as, but not limited to, potash, potassium chloride, potassium oxide, potassium nitrate, potassium carbonate, and potassium phosphates; urea and other inorganic nitrogen sources; elemental sulfur and other sources of sulfur; gypsum; phosphate salts, such as, but not limited to, those phosphate salts described herein above; ammonium salts, such as, but not limited to, those ammonium salts described herein above; trace elements, and combinations of any thereof. Trace elements include, but are not limited to salts of calcium, magnesium, iron, zinc, copper, and manganese.

In certain non-limiting embodiments, the organic fertilizers of the present invention may further comprise an inorganic fertilizer component comprising at least one of a potassium salt, such as those described herein, and a phosphate salt or phosphite salt, such as those described herein, including potassium phosphate and potassium phosphite salts. Addition of one or more potassium, phosphate, and/or phosphite salts to the fertilizer may increase the overall amount of potassium and/or phosphorous in the fertilizer. Three ingredients found in fertilizers are nitrogen, phosphorous and potassium, the concentration of which may be indicated by a fertilizers N—P—K. rating. According to certain non-limiting embodiments, sufficient soluble salts of potassium and/or phosphate may be added to the fertilizer to provide the desired N—P—K rating. According to certain non-limiting embodiments, the fertilizer may comprise from about 5% to about 30% by weight of potassium in the form of a potassium salt and/or from about 2% to about 20% by weight of phosphorous in the form of a phosphate salt and/or a phosphite salt.

In another non-limiting embodiment, the trace elements may be in a chelated form and made from an amino acid (e.g., threonine or lysine) liquor stream. The amino acid chelate may be admixed with the fertilizer composition in order to provide the trace elements to the soil.

According to other non-limiting embodiments, the present disclosure also provides for a fertilizer composition comprising means for increasing the nitrogen content of a soil and a dispersing agent. According to certain non-limiting embodiments, the means for increasing the nitrogen content of a soil comprises one or more organic compounds selected from the group consisting of a lysine product, a fermentation cell broth, an ammonium salt of an organic acid, an amidated organic carboxylic acid, products and/or by-products generated at an agricultural product processing facility, and a soluble plant protein or mixtures thereof. According to certain non-limiting embodiments, the dispersing agent may comprise a polymer and/or water.

Certain non-limiting embodiments of the fertilizers disclosed herein may be a certified organic fertilizer, for example, by receiving a certified organic seal from a government agency, such as, the National Organic Program under the United States Department of Agriculture. Certain non-limiting embodiments of the compositions and methods herein may comprise indicia indicating that the fertilizer is a certified organic fertilizer or may comprise acts including associating indicia with the fertilizer or a container containing the fertilizer wherein the indicia indicates that the fertilizer is a certified organic fertilizer.

The present disclosure also provides for various non-limiting methods for increasing nitrogen content in soil, increasing soil microbe population, promoting crop production, and fertilizing horticultural or agricultural crops. According to certain non-limiting embodiments of the methods, the present disclosure provides a method of increasing nitrogen content in soil comprising applying any of the fertilizer compositions, as described herein, to the soil or soil having plants growing therein, wherein the fertilizer composition promotes plant growth and/or production. According to certain non-limiting embodiments, the fertilizer composition promotes the growth of for example, turf grass, According to certain non-limiting embodiments, applying the fertilizer composition to the soil comprises spreading the fertilizer composition onto the soil. According to certain embodiments, wherein the fertilizer composition is a solid, the fertilizer may be spread onto the soil by broadcasting the fertilizer onto the surface of the soil, which may be tilled into the soil or watered into the soil; or the fertilizer may be spread onto the soil by banding (i.e., applying in rows or "bands") on or beneath the surface of the soil.

According to other non-limiting embodiments, spreading the fertilizer composition on the soil may comprise spraying the fertilizer composition onto the soil. The fertilizer composition may be sprayed, for example, when the fertilizer composition comprises an aqueous formulation, such as an aqueous homogeneous solution or an aqueous heterogeneous suspension. In certain non-limiting embodiments where the fertilizer composition is sprayed, the fertilizer composition may be sprayed by foliar application, i.e., sprayed directly onto the plant.

According to still other non-limiting embodiments, the fertilizer composition may be dissolved in an aqueous homogeneous solution and applied to at least a portion of a root system of a plant via a hydroponic system or an aeroponic system. That is, the root system of the plan may be contacted with the aqueous solution comprising the fertilizer composition, for example, by submerging at least a portion of the root system in the aqueous solution comprising the fertilizer or by spraying a mist or otherwise applying the aqueous solution comprising the fertilizer to at least a portion of the root system of the plant.

According to other non-limiting embodiments, the present disclosure provides for methods of promoting crop production comprising applying the fertilizer composition, as described herein, to a plant or a soil. According to certain non-limiting embodiments, the fertilizer composition is applied to a plant, wherein the plant is turf grass. According to other non-limiting embodiments, the fertilizer composition is applied to a plant, wherein the plant is a commercial crop plant.

According to other non-limiting embodiments, the present disclosure provides for methods of fertilizing horticultural or agricultural crops, where the methods comprise applying the fertilizer composition, as described herein, to the horticultural or agricultural crop, or the soil in which the horticultural or agricultural crop is planted in, such that the fertilizer composition promotes growth and/or production of the horticultural or agricultural crop and/or increases a soil microbial population. As used herein, "horticultural or agricultural crop" includes, without limitation crops such as any agricultural or horticultural plant grown to satisfy a need, such as for food, aesthetics, industrial use, athletic use, and sale, Non-limiting examples of potential "horticultural or agricultural crops" include, but are not limited to, fruits, vegetables, roots and tubers, grains, flowers and other horticultural products, trees, shrubs, turf grass and sod, houseplants, and industrial crops including, but not limited to, corn and/or soybeans for the production of industrial and food products.

In yet an additional non-limiting embodiment, the fertilizer may be produced at a first geographic location and transported or shipped to a second geographic location. For instance, a facility at the first geographic location may be able to produce a product more economically than a facility at the second location due to various factors. The factors may include, for example, lower costs of materials, lower costs of energy (e.g., electricity and/or natural gas or other petroleum products), lower costs of labor (e.g., wages paid to employees), lower costs of environmental controls or effects, or any other requirement for production of the organic fertilizer. Thus, the costs of producing the products in the first geographic location may be less than the costs of producing the products in the second geographic location, resulting in the production costs being less in the first geographic location.

In such an instance, the fertilizer may be produced at the first geographic location and shipped to the second geographic location such as by transport over water with ships or barges, trucking, flying, by rail, or other means of transportation. The geographic location may be a county, a state, a country, a continent, and/or combinations of any thereof In this manner the product may be produced, for example, in a first county, state, country, or continent, and transported to and/or sold in a second county, state, country, or continent.

Various embodiments of fertilizer compositions according to the present disclosure will be exemplified in the following examples. Those having ordinary skill in the relevant art will appreciate that various changes in the components, compositions, details, materials, and process parameters of the examples that are hereafter described and illustrated in order to explain the nature of the invention may be made by those skilled in the art, and all such modifications will remain within the principle and scope of the invention as expressed herein and in the appended claims. It will also be appreciated by those skilled in the art that changes could be made to the embodiments described above and below without departing from the broad inventive concept thereof. It is understood therefore, that this invention is not limited to the particular embodiments disclosed, but is intended to cover modifications that are within the principle and scope of the invention, as defined by the claims.

EXAMPLES

Example 1

A fertilizer composition may be prepared with an organic compound that is L-lysine monohydrochloride (HCl). L-lysine monohydrochloride (available from Archer-Daniels-Midland Company, Decatur, Ill., as well as other suppliers) may be utilized either as a granular solid or as an aqueous solution. L-lysine (HCl) has a purity of 98.5%, a crude protein content of about 94.4% (as measured by a nitrogen content times 6.25), an HCl content of about 19.7%, and an L-lysine content of about 78.8% with about 100% isomeric purity. Commercial L-Lysine (HCl) may come in the form of tan colored granules having a particle size of <1.19 mm (85%) and <0.17 mm (5%). L-Lysine (HCl) has a solubility in $H_2O$ at 25° C. ranging from 500 g/L to 600 g/L. and has a bulk density ranging from 0.61 $g/cm^3$ to 0.71 $g/cm^3$. The L-lysine (HCl) may be feed grade, commercial grade, or any other suitable grade. L-lysine (HCl) has a nitrogen content of approximately 15% and is readily available at a low unit cost of nitrogen. The L-lysine (HCl) may be applied to soil in an amount of about 50 lbs/acre to about 1500 lbs/acre.

Example 2

A fertilizer composition may be prepared with an organic compound that is LIQUID LYSINE brand lysine (available from Archer-Daniels-Midland Company, Decatur, Ill.). LIQUID LYSINE brand lysine is an approximately 50% (by weight) aqueous solution of L-lysine free-base obtained by concentrating lysine from a lysine fermentation broth. LIQUID LYSINE brand lysine is a dark brown liquid having a crude protein content of about 61.5% (as measured by a nitrogen content times 6.25), a density of from about 9.5 lbs/gal to about 9.6 lbs/gal, and an L-lysine content of about 50% with about 100% isomeric purity. The LIQUID LYSINE brand lysine may be sprayed directly onto the soil in an amount of about 1.0 L/acre to about 350 L/acre or diluted with water to a concentration of about 1% to about 99% by weight of LIQUID LYSINE brand lysine and the diluted solution applied to the soil in an amount of about 1.0 L/acre to about 4000 L/acre.

Example 3

A fertilizer composition may be prepared with an organic compound that is LIQUID LYSINE brand lysine. LIQUID LYSINE brand lysine comprises a 50%, by weight, aqueous solution of L-lysine free-base (100% isomeric purity). LIQUID LYSINE may further comprise small amounts of other complex organic molecules, such as, for example, carbohydrates. LIQUID LYSINE is a dark brown liquid, having a density ranging from about 1.13 $g/cm^3$ to about 1.15 $g/cm^3$ and a pH ranging from about 9.6 to about 11.0. LIQUID LYSINE may have an L-lysine content of about 50% (minimum) and a moisture content of about 48% (maximum). LIQUID LYSINE may be obtained from concentrating the lysine product of a lysine fermentation process.

The LIQUID LYSINE brand lysine may be sprayed directly onto the soil in an amount of about 165 L/acre to about 496 L/acre. Alternatively, LIQUID LYSINE may be applied as a foliar fertilizer, sprayed directly onto the plant.

The LIQUID LYSINE brand lysine may be diluted with water or concentrated (by water removal) or supplemented with a soluble lysine salt (such as lysine (HCl)) to adjust to nitrogen content to a desired level; and applied to the soil or plant in an amount such that total amount of the LIQUID LYSINE brand lysine is from about 165 L/acre to about 496 L/acre.

Example 4

In this Example, the efficacy of fertilizers on green height, creeping bentgrass was examined. Fertilizer compositions according to several embodiments of the present disclosure were prepared and compared to the commercial fertilizer products, urea 46-0-0 (granular) fertilizer, Lebanon fertilizer 21-0-12 (granular, commercially available from Lebanon Seaboard Corporation, Lebanon, Pa.) and Milorganite 6-2-0 (granular, commercially available from Milorganite, Milwaukee, Wis.). The fertilizer compositions were applied to the turf grass prior to winter dormancy of the turf at a rate equivalent to supplying about 1.0 pounds of nitrogen (N) per 1000 square feet. Each of the fertilizer compositions were applied at substantially equal rates of pounds (lbs) of nitrogen (N) per 1000 square feet. Table 1 illustrates the response of green height (i.e., the height of grass on golf course green), creeping bentgrass to fertilization using various exemplary fertilizers of the present invention, taken about two weeks after application of the fertilizer. The letters in the Color and Injury columns correspond to Duncan's Multiple Range Test. Numbers (means) in a column followed by the same letter are not statistically different at P=0.05.

As the data of Table 1 indicates, no significant differences were observed in overall color or injury between the exemplary fertilizers of the present invention (including, but not limited to, dried soy powder, dry lysine and liquid lysine) and the conventional fertilizers (e.g., urea, milorganite and the Lebanon fertilizer).

TABLE 1

| Treatment | Rate of application (Lbs. product/1000 square feet) | Color 1-9 (9 = dark green) | Injury 1-9 (9 = no injury) |
|---|---|---|---|
| Unfertilized (control) (granular) | — | $5.0^e$ | $8.3^{a,b}$ |
| Urea 46-0-0 (granular) | 1.09 | $6.7^{a,b,c}$ | $8.0^{a,b,c}$ |
| Urea 46-0-0 (granular) | 2.17 | $6.7^{a,b,c}$ | $8.7^a$ |
| Urea 46-0-0 (granular) | 6.51 | $6.0^{d,e}$ | $8.3^{a,b}$ |
| Lebanon Fertilizer 21-0-12 (granular) | 2.38 | $6.3^{b,c}$ | $8.3^{a,b}$ |
| Lebanon Fertilizer 21-0-12 (granular) | 4.76 | $6.7^{a,b,c}$ | $8.0^{a,b,c}$ |
| Lebanon Fertilizer 21-0-12 (granular) | 14.29 | $5.3^{e,d}$ | $8.7^a$ |
| Dried soy powder 10% N (granular) | 5 | $6.7^{a,b,c}$ | $5.7^{d,e}$ |
| Dried soy powder 10% N (granular) | 10 | $6.7^{a,b,c}$ | $6.7^{c,d}$ |
| Dried soy powder 10% N (granular) | 30 | $7.0^{a,b}$ | $5.0^{e,f}$ |
| Dry lysine 9.6% N (granular) | 5.21 | $7.0^{a,b}$ | $8.0^{a,b,c}$ |
| Dry lysine 9.6% N (granular) | 10.46 | $7.0^{a,b}$ | $7.7^{a,b,c}$ |
| Dry lysine 9.6% N (granular) | 31.38 | $6.7^{a,b,c}$ | $3.3^g$ |
| Liquid lysine 12.5% (liquid spray) | 4 | $6.7^{a,b,c}$ | $7.7^{a,b,c}$ |
| Liquid lysine 12.5% (liquid spray) | 8 | $6.7^{a,b,c}$ | $8.3^{a,b}$ |
| Liquid lysine 12.5% (liquid spray) | 24 | $7.3^a$ | $7.0^{b,c,ld}$ |
| Milorganite 6-2-0 (granular) | 8.34 | $6.7^{a,b,c}$ | $8.0^{a,b,c}$ |
| Milorganite 6-2-0 (granular) | 16.67 | $5.3^{e,d}$ | $8.7^a$ |
| Milorganite 6-2-0 (granular) | 50.01 | $5.0^e$ | $8.7^a$ |

Example 5

In this Example, the efficacy of fertilizers on lawn height, Kentucky bluegrass was examined. Fertilizer compositions according to several embodiments of the present disclosure were prepared and compared to the commercial fertilizer products, urea 46-0-0 (granular) fertilizer, Lebanon fertilizer 21-0-12 (granular, commercially available from Lebanon Seaboard Corporation, Lebanon, Pa.) and Milorganite 6-2-0 (granular, commercially available from Milorganite, Milwaukee, Wis.). The fertilizer compositions were applied to the turf grass prior to winter dormancy at a rate equivalent to supplying about 1.0 pounds of nitrogen (N) per 1000 square feet. Each of the fertilizer compositions were applied at substantially equal rates of lbs of nitrogen (N) per 1000 square feet. Table 2 illustrates the response of lawn height, Kentucky bluegrass to fertilization using various exemplary fertilizers of the present invention, taken about two weeks after application of the fertilizer. The letters in the Color and Injury columns correspond to Duncan's Multiple Range Test.

As the data of Table 2 indicates, no significant differences were observed in overall color or injury between the exemplary fertilizers of the present invention (including, but not limited to, dried soy powder, dry lysine and liquid lysine) and the conventional fertilizers (e.g., urea, milorganite and the Lebanon fertilizer).

TABLE 2

| Treatment | Rate of application (Lbs. product/1000 square feet) | Color 1-9 (9 = dark green) | Injury 1-9 (9 = no injury) |
|---|---|---|---|
| Unfertilized (control) (granular) | — | 6.3 | 9.0 |
| Urea 46-0-0 (granular) | 1.09 | 7.0 | 8.3 |
| Urea 46-0-0 (granular) | 2.17 | 7.3 | 8.7 |
| Urea 46-0-0 (granular) | 6.51 | 7.7 | 8.7 |
| Lebanon Fertilizer 21-0-12 (granular) | 2.38 | 7.0 | 9.0 |
| Lebanon Fertilizer 21-0-12 (granular) | 4.76 | 8.0 | 9.0 |
| Lebanon Fertilizer 21-0-12 (granular) | 14.29 | 8.0 | 8.7 |
| Dried soy powder 10% N (granular) | 5 | 7.3 | 9.0 |
| Dried soy powder 10% N (granular) | 10 | 7.3 | 8.3 |
| Dried soy powder 10% N (granular) | 30 | 7.7 | 8.3 |
| Dry lysine 9.6% N (granular) | 5.21 | 7.3 | 8.7 |
| Dry lysine 9.6% N (granular) | 10.46 | 7.3 | 8.3 |
| Dry lysine 9.6% N (granular) | 31.38 | 7.3 | 9.0 |

TABLE 2-continued

| Treatment | Rate of application (Lbs. product/1000 square feet) | Color 1-9 (9 = dark green) | Injury 1-9 (9 = no injury) |
|---|---|---|---|
| Liquid lysine 12.5% (liquid spray) | 4 | 7.3 | 7.7 |
| Liquid lysine 12.5% (liquid spray) | 8 | 7.3 | 8.7 |
| Liquid lysine 12.5% (liquid spray) | 24 | 7.0 | 8.0 |
| Milorganite 6-2-0 (granular) | 8.34 | 6.0 | 9.0 |
| Milorganite 6-2-0 (granular) | 16.67 | 7.3 | 7.7 |
| Milorganite 6-2-0 (granular) | 50.01 | 7.3 | 9.0 |

Example 6

In this Example, the efficacy of fertilizers on fairway height, creeping bentgrass was examined. Fertilizer compositions according to several embodiments of the present disclosure were prepared and compared to the commercial fertilizer products, urea 46-0-0 (granular) fertilizer, Lebanon fertilizer 21-0-12 (granular, commercially available from Lebanon Seaboard Corporation, Lebanon, Pa.) and Milorganite 6-2-0 (granular, commercially available from Milorganite, Milwaukee, Wis.). The fertilizer compositions were applied to turf prior to winter dormancy at a rate equivalent to supplying about 1.0 pounds of nitrogen (N) per 1000 square feet. Each of the fertilizer compositions were applied at substantially equal rates of lbs of nitrogen (N) per 1000 square feet. Table 3 illustrates the response of fairway height, creeping bentgrass to fertilization using various exemplary fertilizers of the present invention, taken about two weeks after application of the fertilizer. The letters in the Color and Injury columns correspond to Duncan's Multiple Range Test. Numbers (means) in a column followed by the same letter are not statistically different at P=0.05.

As the data of Table 3 indicates, no significant differences were observed in overall color or injury between the exemplary fertilizers of the present invention including, but not limited to, dried soy powder, dry lysine and liquid lysine and the conventional fertilizers (e.g., urea, milorganite and the Lebanon fertilizer).

TABLE 3

| Treatment | Rate of application (Lbs. product/1000 square feet) | Color 1-9 (9 = dark green) | Injury 1-9 (9 = no injury) |
|---|---|---|---|
| Unfertilized (control) (granular) | — | 7.0 | 8.7$^{a,b}$ |
| Urea 46-0-0 (granular) | 1.09 | 6.7 | 8.7$^{a,b}$ |
| Urea 46-0-0 (granular) | 2.17 | 7.0 | 7.7$^{a,b}$ |
| Urea 46-0-0 (granular) | 6.51 | 7.7 | 8.7$^{a,b}$ |
| Lebanon Fertilizer 21-0-12 (granular) | 2.38 | 7.0 | 8.3$^{a,b}$ |
| Lebanon Fertilizer 21-0-12 (granular) | 4.76 | 7.3 | 8.3$^{a,b}$ |
| Lebanon Fertilizer 21-0-12 (granular) | 14.29 | 7.3 | 8.3$^{a,b}$ |
| Dried soy powder 10% N (granular) | 5 | 7.0 | 8.3$^{a,b}$ |
| Dried soy powder 10% N (granular) | 10 | 7.0 | 8.0$^{a,b}$ |

TABLE 3-continued

| Treatment | Rate of application (Lbs. product/1000 square feet) | Color 1-9 (9 = dark green) | Injury 1-9 (9 = no injury) |
|---|---|---|---|
| Dried soy powder 10% N (granular) | 30 | 7.0 | 6.0$^{d,c}$ |
| Dry lysine 9.6% N (granular) | 5.21 | 7.3 | 9.0$^{a}$ |
| Dry lysine 9.6% N (granular) | 10.46 | 7.0 | 8.0$^{a,b}$ |
| Dry lysine 9.6% N (granular) | 31.38 | 6.7 | 6.0$^{d,c}$ |
| Liquid lysine 12.5% (liquid spray) | 4 | 7.0 | 8.3$^{a,b}$ |
| Liquid lysine 12.5% (liquid spray) | 8 | 7.3 | 8.7$^{a,b}$ |
| Liquid lysine 12.5% (liquid spray) | 24 | 7.0 | 6.0$^{d,c}$ |
| Milorganite 6-2-0 (granular) | 8.34 | 7.7 | 9.0$^{a}$ |
| Milorganite 6-2-0 (granular) | 16.67 | 7.0 | 9.0$^{a}$ |
| Milorganite 6-2-0 (granular) | 50.01 | 7.0 | 8.7$^{a,b}$ |

Example 7

A first formulation of a fertilizer composition comprising soybean meal and lysine (HCl) was prepared (Formula 1). The fertilizer composition included 62.02% by weight of a 47.5% soybean meal composition (1240.4 g), 34.98% by weight of lysine (HCl) (699.6 g, 98% purity), and 3.00% by weight of soybean oil (60.0 g).

A second formulation for the fertilizer composition comprising soybean meal and lysine (HCl) was prepared (Formula 2). The fertilizer composition included 62.02% by weight of a 47.5% soybean meal composition (1240.4 g), 34.98% by weight of granulated lysine (HCl) (699.6 g, 98% purity), and 3.00% by weight of the coating, hydrogenated soybean oil (60.0 g).

The fertilizer compositions were produced as a granular fertilizer with a nitrogen content of about 10% to about 10.5%. The nutrient analysis of the fertilizer compositions (Formulations 1 and 2) are presented in Table 4. The resulting fertilizer compositions had a tan color and a neutral to pleasing odor. A solubility test showed that the lysine component dissolved in water, whereas the soybean-based protein particles substantially maintained their form while becoming fully hydrated. The fertilizer compositions were applied to a soil or a crop, such as a turf grass.

TABLE 4

| Ingredient | Formula 1 Percent (%) | Formula 2 Percent (%) |
|---|---|---|
| Protein | 68.4% | 68.4% |
| Fat (crude) | 3.9% | 3.9% |
| Crude fiber | 2.6% | 2.6% |
| Moisture | 8.5% | 8.5% |
| Calcium | 0.256% | 0.256% |
| Phosphorus | 0.491% | 0.491% |
| Phosphors (Abs) | 0.344% | 0.344% |
| Sodium | 0.020% | 0.020% |
| Chloride | 7.250% | 7.249% |
| Magnesium | 0.181% | 0.182% |
| Potassium | 1.278% | 1.278% |
| Sulfur | 0.289% | 0.289% |
| Zinc | 37.0 ppm | 37.0 ppm |

Example 8

In this Example, the effect on various embodiments of the fertilizer composition on soil microbial population (bacterial and fungal) was examined. The Example compared the effect on total microbial populations 24, 48 and 72 hours after application of the fertilizer to a Kentucky bluegrass turf.

The following fertilizer compositions were used: urea, dry lysine (lysine (HCl), LIQUID LYSINE brand aqueous lysine solution (available from Archer-Daniels-Midland Company, Decatur, Ill.), a threonine cell mass, a lysine cell mass, and soy/lysine combination (a granular mixture of dry lysine and soy flour, soy flakes and soybean oil. Analysis of the threonine cell mass is presented in Table 5. The effect of the fertilizer compositions on microbial population were compared with a control plot to which no fertilizer composition was applied. The dry lysine was dissolved in water and applied by spraying on the turf plot. The microbial population was measured after 24 hours, 48 hours and 72 hours and the results are shown in FIG. 1. The fertilizer compositions were applied at a rate of 1.0 lb N/1000 ft$^2$ of Kentucky bluegrass turf Soil samples from the turf were analyzed for total soil bacteria and fungi by standard plate count and dilution series.

Figure 5:
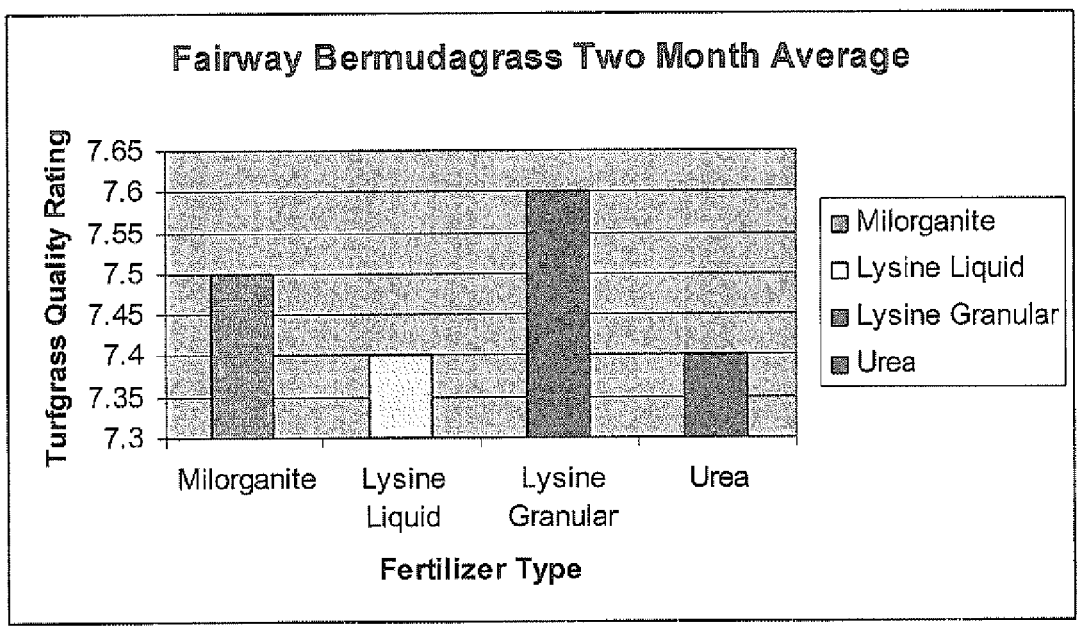
FIG. 5 illustrates the average two month quality ratings on Bermuda fairway turfgrass for various fertilizer compositions.

FIG. 5. Threonine Cell Mass Analysis

| Component | Content (wt %) | Amino Acid Profile | Content (wt %) |
|---|---|---|---|
| Protein | 87.07% | Taurine | 0.05% |
| Lignan | 0.534% | Aspartic acid | 7.83% |
| Fat | 3.74% | Threonine | 4.37% |
| Ash | 3.53% | Serine | 2.57% |
| Calcium | 0.0107% | Glutamic acid | 9.58% |
| Phosphorus | 1.015% | Proline | 3.07% |
| Magnesium | 0.0427% | Glycine | 3.53% |
| Potassium | 0.321% | Alanine | 5.69% |
| Sodium | 196.58 ppm | Cysteine | 0.83% |
| Zinc | 1.04 ppm | Valine | 5.12% |
| Ammonia | 0.0855% | Methionine | 2.05% |
| Copper | 4.70 ppm | Isoleucine | 3.96% |
| Manganese | 24.25 ppm | Leucine | 7.06% |
| Sulfur | 0.684% | Tyrosine | 2.70% |
| Non-protein nitrogen | 0.748% | Phenylalanine | 3.25% |
|  |  | Histidine | 1.86% |
|  |  | Ornithine | 0.03% |
|  |  | Lysine | 5.22% |
|  |  | Arginine | 4.91% |
|  |  | Tryptophan | 1.16% |

Urea and dry lysine treatments did not significantly differ in microbial populations from controls indicating that lysine is almost as molecularly simple as urea. The liquid lysine material was somewhat more responsive than the dry lysine at the same nitrogen rates. The threonine cell mass had a very obvious and significant effect on soil microbial activities within the 24 hour period, as well as out to 72 hours. The threonine treatment was approximately 7 times higher than controls after 48 hours. The soy flour/flake/lysine granular performed showed a significant increase over the 72 hour time period which was 4-5 times greater than controls and still on an upward trend. This indicated a significant response with longer residual activities.

Example 9

In this Example, the effect of a fertilizer comprising lysine on warn season turfgrass growth was examined. The effects of lysine (HCl) and LIQUID LYSINE on a common type of lawn quality turfgrass (St. Augustine grass) were compared with those of urea and Milorganite. St. Augustine grass is a commonly utilized turfgrass throughout the warm, tropical zones for lawn turf and is a commercially significant species.

Figure 2:
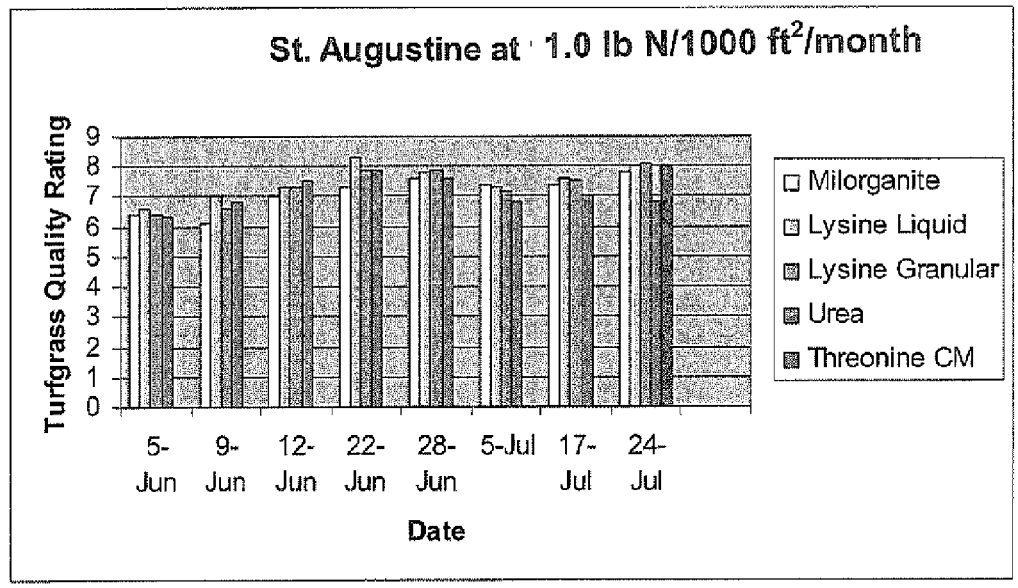
FIG. 2 illustrates the effect on turfgrass quality of St. Augustine grass after application of various fertilizer compositions.
Figure 3:
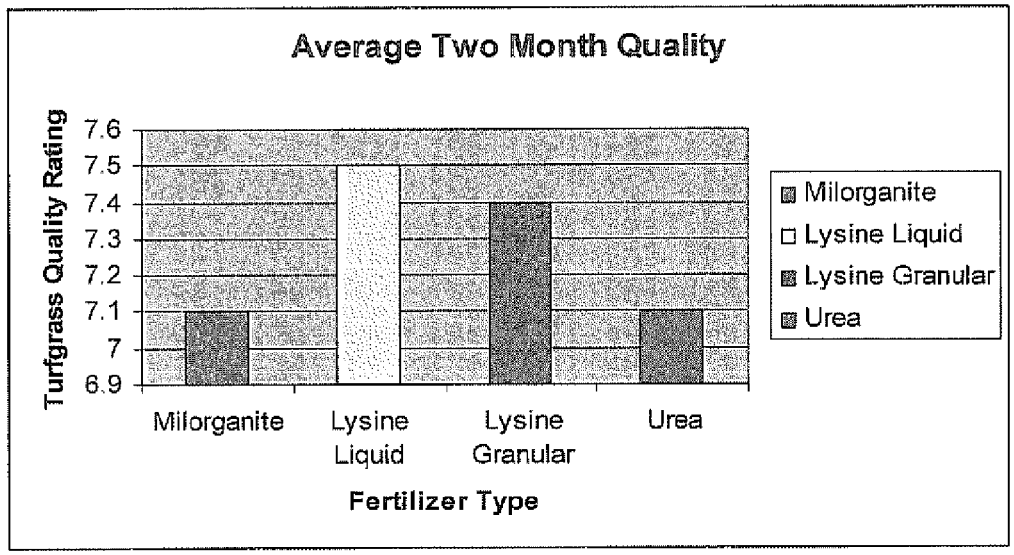
FIG. 3 illustrates the average two month quality ratings on St. Augustine grass for various fertilizer compositions.

Twelve fertilizer treatments comprising three concentrations of each fertilizer composition (Milorganite (N—P—K, 6-2-0), urea N—P—K, 46-0-0), LIQUID LYSINE (N—P—K, 10-2-1), and lysine (HCl) (N—P—K, 15-2-1)) were prepared and applied to 4 replications of Floratam St. Augustine grass. The lysine (HCl) was dissolved in water prior to application. Each fertilizer treatment was applied in concentrations of 0.5 lb N/1000 ft$^2$/month, 1.0 lb N/1000 ft$^2$/month and 3.0 lb N/1000 ft$^2$/month. The urea, LIQUID LYSINE and lysine (HCl) were applied as foliar liquids, while Milorganite was applied as a granular fertilizer. Plot size was 1 m×2 m set up as a randomized complete block. Plots were mowed at 3.0 inches before fertilizer application. Irrigation (0.15 inch) was applied following application. Plots were rated for turfgrass quality and color (scale of 1-10 where 10=dark green turf, 1=dead/brown turf; and 6=minimally acceptable turf) and phytotoxicity (scale of 0-5, where 5=worst, and 2=minimally objectionable) throughout the study period. Quality, color, and phytotoxicity were measured on 2 days before application (day −2) and day 2, day 5, day 15 and day 21 after application. All data was subject to statistical analysis and significant means were determined. Average turfgrass quality ratings for the treatments are presented in Table 6 and the quality results for application rates of 1.0 lb N/1000 ft$^2$/month are graphically presented in FIG. 2. Average turfgrass color ratings are presented in Table 7. Average phytotoxicity ratings are presented in Table 8. Average 2-month turfgrass quality rating for all fertilizer compositions is presented in FIG. 3.

TABLE 6

Quality Ratings - St. Augustine Grass

| Treatment | Monthly Rate (lbs N/1000 ft$^2$) | Day −2 | Day 2 | Day 5 | Day 15 | Day 21 |
|---|---|---|---|---|---|---|
| Milorganite | 0.5 | 6.4 | 6.6 | 6.5e | 7.0f | 7.0d |
| Milorganite | 1.0 | 6.4 | 6.1 | 7.0cd | 7.3ef | 7.6bc |
| Milorganite | 3.0 | 6.3 | 6.8 | 7.1bcd | 8.5bc | 8.0ab |
| Urea | 0.5 | 6.3 | 6.8 | 7.1bcd | 7.6def | 7.6bc |
| Urea | 1.0 | 6.3 | 6.8 | 7.5ab | 7.9cde | 7.6bc |
| Urea | 3.0 | 6.1 | 6.9 | 7.3abc | 9.1ab | 8.3a |
| Lys (HCl) 15% N | 0.5 | 6.5 | 6.5 | 7.1bcd | 7.3ef | 7.3cd |
| Lys (HCl) 15% N | 1.0 | 6.4 | 6.6 | 7.3abc | 7.9cde | 7.9ab |
| Lys (HCl) 15% N | 3.0 | 6.3 | 6.9 | 7.5ab | 9.3a | 7.9ab |
| Liquid Lys 10% N | 0.5 | 6.5 | 6.6 | 6.8de | 7.9cde | 7.8abc |

TABLE 6-continued

Quality Ratings - St. Augustine Grass

| Treatment | Monthly Rate (lbs N/1000 ft$^2$) | Day −2 | Day 2 | Day 5 | Day 15 | Day 21 |
|---|---|---|---|---|---|---|
| Liquid Lys 10% N | 1.0 | 6.6 | 7.0 | 7.3abc | 8.3cd | 7.8abc |
| Liquid Lys 10% N | 3.0 | 6.4 | 7.2 | 7.5ab | 9.1ab | 8.0ab |
| Significance | — | ns | ns |  |  | ** | ns and ** = P > 0.10 and P < 0.01 respectively.
Means with the same letter within a column are not significant according to Duncan's Multiple Range Test.

TABLE 7

Color Ratings - St. Augustine Grass

| Treatment | Monthly Rate (lbs N/1000 ft$^2$) | Day −2 | Day 2 | Day 5 | Day 15 | Day 21 |
|---|---|---|---|---|---|---|
| Milorganite | 0.5 | 6.6 | 6.5 | 6.5e | 6.6f | 7.4c |
| Milorganite | 1.0 | 6.5 | 6.4 | 7.0de | 7.1def | 7.6bc |
| Milorganite | 3.0 | 6.4 | 6.5 | 7.4cd | 8.3ab | 8.1ab |
| Urea | 0.5 | 6.4 | 6.9 | 7.4cd | 7.8bc | 7.6bc |
| Urea | 1.0 | 6.4 | 6.9 | 7.6bc | 7.5cde | 7.9abc |
| Urea | 3.0 | 6.1 | 6.8 | 8.3a | 8.8a | 8.5a |
| Lys (HCl) 15% N | 0.5 | 6.6 | 6.5 | 7.3cd | 7.0ef | 7.4c |
| Lys (HCl) 15% N | 1.0 | 6.6 | 7.0 | 7.6bc | 7.6cd | 8.0abc |
| Lys (HCl) 15% N | 3.0 | 6.6 | 6.6 | 8.0ab | 8.6a | 8.0abc |
| Liquid Lys 10% N | 0.5 | 6.6 | 6.9 | 7.1cd | 7.5cde | 7.9abc |
| Liquid Lys 10% N | 1.0 | 6.8 | 6.8 | 7.6bc | 7.5cde | 7.9abc |
| Liquid Lys 10% N | 3.0 | 6.5 | 7.1 | 8.5a | 8.5a | 8.3ab |
| Significance | — | ns | ns |  |  | ** | ns and ** = P > 0.10 and P < 0.01 respectively.
Means with the same letter within a column are not significant according to Duncan's Multiple Range Test.

TABLE 8

Phytotoxicity - St. Augustine Grass

| Treatment | Monthly Rate (lbs N/1000 ft$^2$) | Day −2 | Day 2 | Day 5 | Day 15 | Day 21 |
|---|---|---|---|---|---|---|
| Milorganite | 0.5 | 0 | 0.0c | 0.0d | 0 | 0 |
| Milorganite | 1.0 | 0 | 0.0c | 0.5cd | 0 | 0 |
| Milorganite | 3.0 | 0 | 0.5bc | 1.3bcd | 0 | 0 |
| Urea | 0.5 | 0 | 0.6bc | 1.6bc | 0 | 0 |
| Urea | 1.0 | 0 | 1.5b | 2.0ab | 0 | 0 |
| Urea | 3.0 | 0 | 2.8a | 3.0a | 0 | 0 |
| Lys (HCl) 15% N | 0.5 | 0 | 0.0c | 0.4cd | 0 | 0 |
| Lys (HCl) 15% N | 1.0 | 0 | 0.0c | 1.1bcd | 0 | 0 |
| Lys (HCl) 15% N | 3.0 | 0 | 0.4bc | 1.1bcd | 0 | 0 |
| Liquid Lys 10% N | 0.5 | 0 | 0.1c | 1.3bcd | 0 | 0 |
| Liquid Lys 10% N | 1.0 | 0 | 0.3bc | 0.6cd | 0 | 0 |
| Liquid Lys 10% N | 3.0 | 0 | 0.3bc | 0.8bcd | 0 | 0 |
| Significance | — | ns |  |  | ns | ns | ns and ** = P > 0.10 and P < 0.01 respectively.
Means with the same letter within a column are not significant according to Duncan's Multiple Range Test.

Both lysine based fertilizer treatments had quality and color results that were equivalent with those of urea and greater than those for milorganite for all levels of application. Both lysine based fertilizer treatments and the milorganite treatment showed no significant phytotoxicity at all three levels of application. Urea showed some phytotoxicity at the 1.0 lb N/1000 ft$^2$ and the 3.0 lb N/1000 ft$^2$ application rate. The two lysine fertilizer compositions demonstrate similar rapid growth and color responses for St. Augustine grass (lawn grass) as those of urea with less phytotoxicity and greater growth and color response than was observed for milorganite.

Example 10

In this Example, the effect of a fertilizer comprising lysine on warm season turfgrass growth was examined. The effects of lysine (HCl) and LIQUID LYSINE on a common type of golf course fairway quality turfgrass (Bermuda grass) were compared with those of urea and Milorganite.

Figure 4:
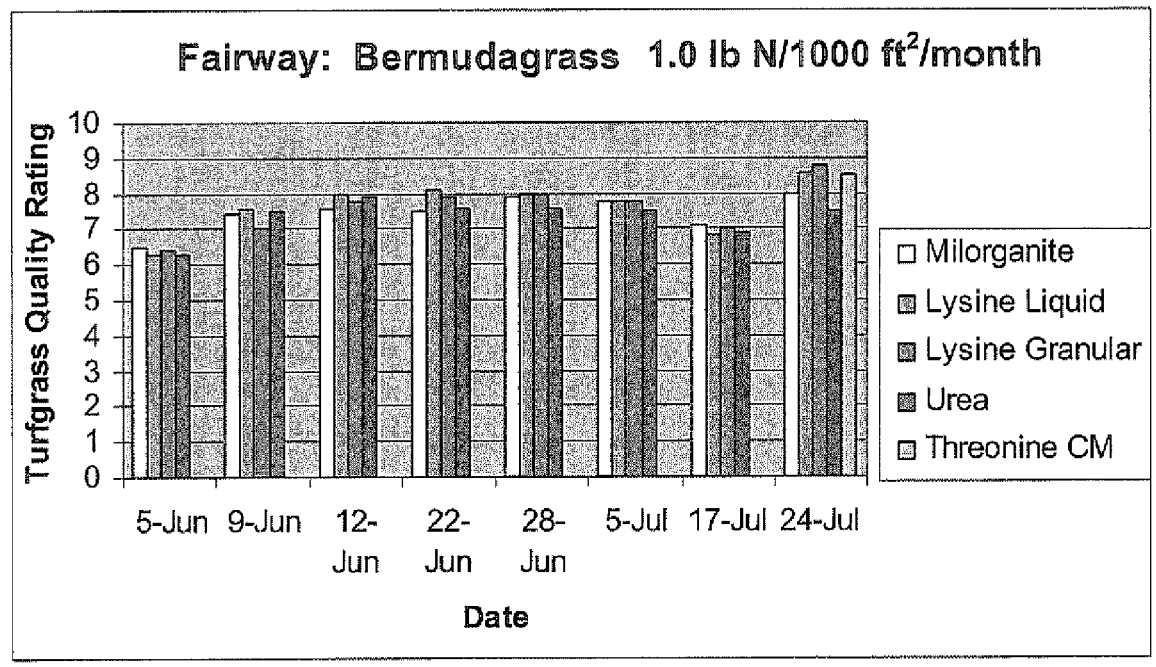
FIG. 4 illustrates the effect on turfgrass quality of Bermuda fairway turfgrass after application of various fertilizer compositions.

Fifteen fertilizer treatments comprising three concentrations of each fertilizer composition (Milorganite (N—P—K, 6-2-0), urea (N—P—K, 46-0-0), LIQUID LYSINE (N—P—K, 10-2-1), and both granular and aqueous lysine (HCl) (N—P—K, 15-2-1)) were prepared and applied to 4 replications of Bermuda grass. The aqueous lysine (HCl) was dissolved in water prior to application. Each fertilizer treatment was applied in concentrations of 0.5 lb N/1000 ft²/month, 1.0 lb N/1000 ft²/month and 3.0 lb N/1000 ft²/month. The urea, LIQUID LYSINE and aqueous lysine (HCl) were applied as foliar liquids, while Milorganite and granular lysine (HCl) were applied as granular fertilizers Plot size was 1 m×2 m set up as a randomized complete block. Plots were mowed at 0.5 inches before fertilizer application. Irrigation (0.15 inch) was applied following application. Plots were rated for turfgrass quality and color (scale of 1-10 where 10=dark green turf, 1=dead/brown turf, and 6=minimally acceptable turf) and phytotoxicity (scale of 0-5, where 5=worst, and 2=minimally objectionable) throughout the study period. Quality, color, and phytotoxicity were measured on 2 days before application (day −2) and day 2, day 5, day 15 and day 21 after application. All data was subject to statistical analysis and significant means were determined. Average turfgrass quality ratings for the treatments are presented in Table 9 and the quality results for application rates of 1.0 lb N/1000 ft²/month are graphically presented in FIG. 4. Average turfgrass color ratings are presented in Table 10. Average phytotoxicity ratings are presented in Table 11. Average 2-month turfgrass quality rating for the four fertilizer compositions is presented in FIG. 5.

TABLE 9

Quality Ratings - Bermuda Grass

| Treatment | Monthly Rate (lbs N/1000 ft²) | Day −2 | Day 2 | Day 5 | Day 15 | Day 21 |
|---|---|---|---|---|---|---|
| Milorganite | 0.5 | 6.3 | 7.0b | 7.1d | 7.5d | 7.5f |
| Milorganite | 1.0 | 6.5 | 7.4b | 7.6bcd | 7.5de | 7.9def |
| Milorganite | 3.0 | 6.4 | 7.4b | 7.6bcd | 8.8b | 8.4abc |
| Urea | 0.5 | 6.3 | 7.5ab | 7.5cd | 7.5de | 7.5f |
| Urea | 1.0 | 6.3 | 7.5ab | 7.9abc | 7.6de | 7.6ef |
| Urea | 3.0 | 6.1 | 8.1a | 8.3ab | 7.9de | 7.8def |
| Lys (HCl) 15% N (gran) | 0.5 | 6.5 | 7.3b | 7.6bcd | 7.4e | 7.9def |
| Lys (HCl) 15% N (gran) | 1.0 | 6.3 | 7.6ab | 7.9abc | 8.1cd | 8.1bcd |
| Lys (HCl) 15% N (gran) | 3.0 | 6.1 | 7.4b | 8.5a | 9.4a | 8.6a |
| Lys (HCl) 15% N (aq) | 0.5 | 6.3 | 7.3b | 7.1d | 7.8de | 8.0cde |
| Lys (HCl) 15% N (aq) | 1.0 | 6.4 | 7.0b | 7.8bcd | 7.9de | 8.0cde |
| Lys (HCl) 15% N (aq) | 3.0 | 6.0 | 7.4b | 8.3ab | 8.8b | 8.5ab |
| Liquid Lys 10% N | 0.5 | 6.1 | 7.4b | 7.6bcd | 8.0de | 7.9def |
| Liquid Lys 10% N | 1.0 | 6.3 | 7.6ab | 8.0abc | 8.1de | 8.0cde |
| Liquid Lys 10% N | 3.0 | 6.1 | 8.1a | 8.3ab | 8.6bc | 8.6a |
| Significance | | ns | * |  |  | ** | ns, * and ** = P > 0.10, P < 0.05 and P < 0.01 respectively.
Means with the same letter within a column are not significant according to Duncan's Multiple Range Test.

TABLE 10

Color Ratings - Bermuda Grass

| Treatment | Monthly Rate (lbs N/1000 ft²) | Day −2 | Day 2 | Day 5 | Day 15 | Day 21 |
|---|---|---|---|---|---|---|
| Milorganite | 0.5 | 6.5 | 7.0 | 7.4g | 7.3de | 7.5d |
| Milorganite | 1.0 | 6.6 | 7.3 | 7.5fg | 7.1e | 7.9bcd |
| Milorganite | 3.0 | 6.4 | 7.5 | 7.9d-g | 8.4b | 8.8a |
| Urea | 0.5 | 6.5 | 7.4 | 7.6efg | 7.4de | 7.6cd |
| Urea | 1.0 | 6.5 | 7.6 | 8.0def | 7.3de | 7.6cd |
| Urea | 3.0 | 6.4 | 8.0 | 8.8ab | 7.5cde | 7.9bcd |
| Lys (HCl) 15% N (gran) | 0.5 | 6.5 | 7.5 | 8.0def | 7.1e | 8.3b |
| Lys (HCl) 15% N (gran) | 1.0 | 6.4 | 7.9 | 8.3bcd | 7.8cd | 8.3b |
| Lys (HCl) 15% N (gran) | 3.0 | 6.4 | 7.3 | 9.0a | 8.6a | 8.9a |
| Lys (HCl) 15% N (aq) | 0.5 | 6.5 | 7.3 | 7.8d-g | 7.6cde | 8.0bc |
| Lys (HCl) 15% N (aq) | 1.0 | 6.5 | 7.3 | 8.1cde | 7.8cd | 8.0bc |
| Lys (HCl) 15% N (aq) | 3.0 | 6.1 | 7.3 | 9.0a | 8.3ab | 8.8a |
| Liquid Lys 10% N | 0.5 | 6.4 | 7.0 | 7.6efg | 7.5cde | 7.9bcd |
| Liquid Lys 10% N | 1.0 | 6.4 | 7.1 | 8.3bcd | 7.8cd | 8.1b |
| Liquid Lys 10% N | 3.0 | 6.5 | 8.1 | 8.6abc | 8.0bc | 8.9a |
| Significance | | ns | ns |  |  | ** | ns and ** = P > 0.10 and P < 0.01 respectively.
Means with the same letter within a column are not significant according to Duncan's Multiple Range Test.

TABLE 11

Phytotoxicity - Bermuda Grass

| Treatment | Monthly Rate (lbs N/1000 ft$^2$) | Day −2 | Day 2 | Day 5 | Day 15 | Day 21 |
|---|---|---|---|---|---|---|
| Milorganite | 0.5 | 0 | 0.0b | 0 | 0 | 0 |
| Milorganite | 1.0 | 0 | 0.0b | 0 | 0 | 0 |
| Milorganite | 3.0 | 0 | 0.0b | 0 | 0 | 0 |
| Urea | 0.5 | 0 | 0.0b | 0 | 0 | 0 |
| Urea | 1.0 | 0 | 0.0b | 0 | 0 | 0 |
| Urea | 3.0 | 0 | 0.0b | 0 | 0 | 0 |
| Lys (HCl) 15% N (gran) | 0.5 | 0 | 0.0b | 0 | 0 | 0 |
| Lys (HCl) 15% N (gran) | 1.0 | 0 | 0.0b | 0 | 0 | 0 |
| Lys (HCl) 15% N (gran) | 3.0 | 0 | 0.5a | 0 | 0 | 0 |
| Lys (HCl) 15% N (aq) | 0.5 | 0 | 0.0b | 0 | 0 | 0 |
| Lys (HCl) 15% N (aq) | 1.0 | 0 | 0.0b | 0 | 0 | 0 |
| Lys (HCl) 15% N (aq) | 3.0 | 0 | 0.3ab | 0 | 0 | 0 |
| Liquid Lys 10% N | 0.5 | 0 | 0.0b | 0 | 0 | 0 |
| Liquid Lys 10% N | 1.0 | 0 | 0.3ab | 0 | 0 | 0 |
| Liquid Lys 10% N | 3.0 | 0 | 0.0b | 0 | 0 | 0 |
| Significance | | ns | * | ns | ns | ns | ns and * = P > 0.10 and P < 0.05 respectively.
Means with the same letter within a column are not significant according to Duncan's Multiple Range Test.

All three lysine based fertilizer treatments had quality and color results for Bermuda grass that were equivalent to or better than those of urea and milorganite for all levels of application. All fertilizer treatments showed no significant phytotoxicity at all three levels of application.

Example 11

In this Example, the effect of a fertilizer comprising lysine on warm season turfgrass growth was examined. The effects of lysine (HCl) and LIQUID LYSINE on a common type of golf course greens quality turfgrass (ultra-dwarf Bermuda grass) were compared with those of urea and Milorganite.

Figure 6:
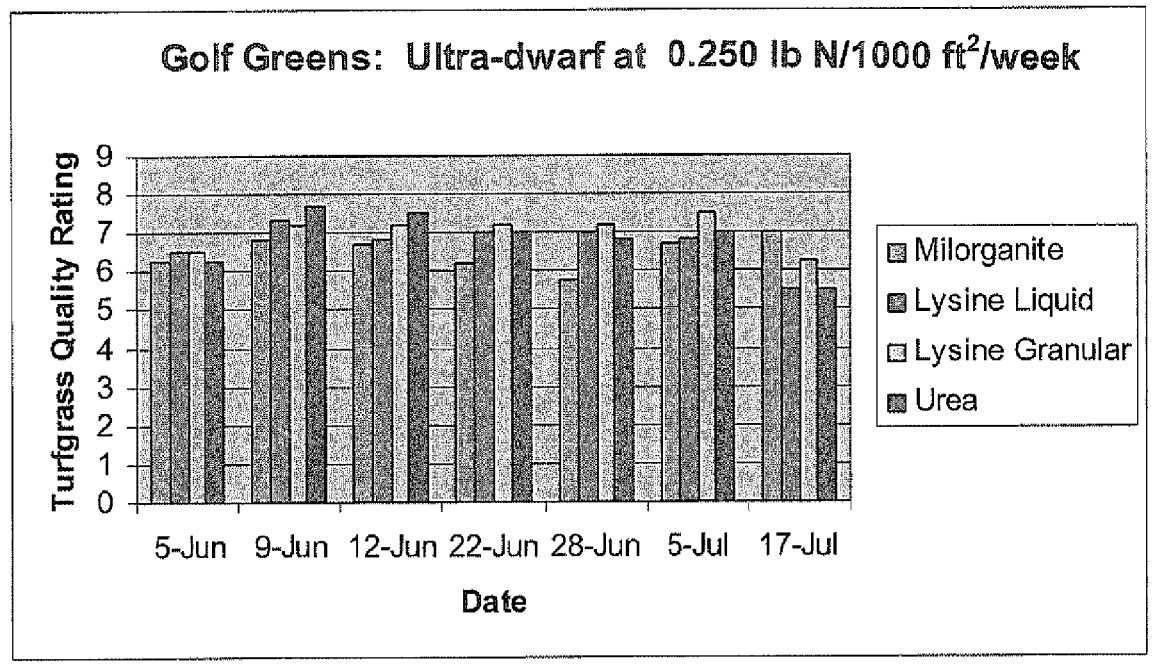
FIG. 6 illustrates the effect on turfgrass quality of ultra-dwarf Bermuda turfgrass for golf greens after application of various fertilizer compositions.
Figure 7:
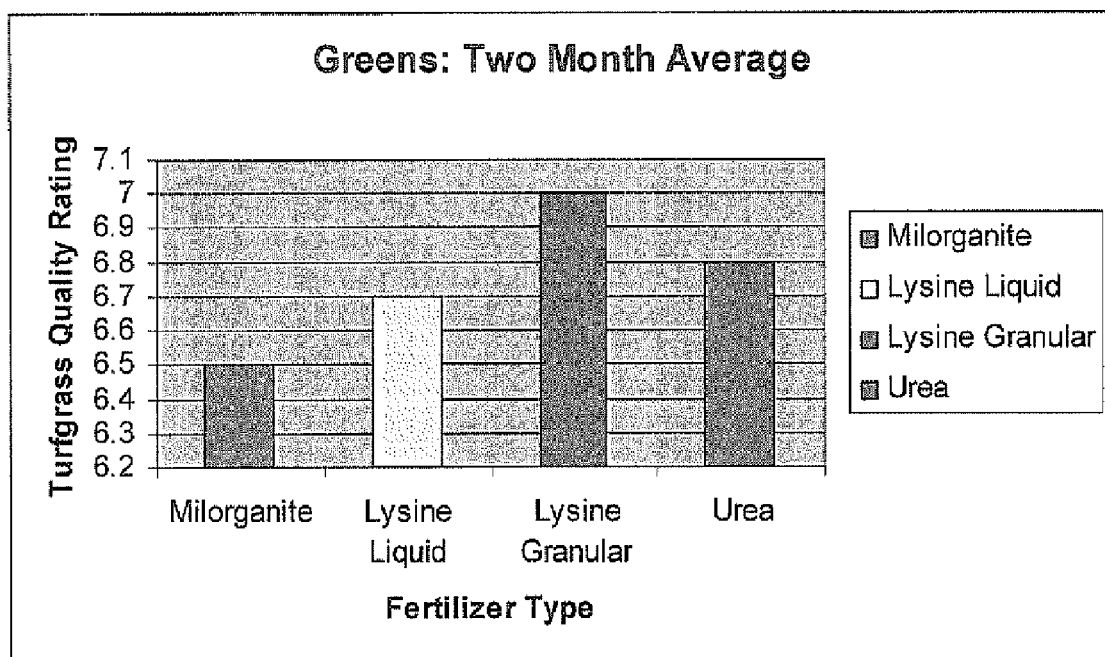
FIG. 7 illustrates the average two month quality ratings on ultra-dwarf Bermuda turfgrass for golf greens for various fertilizer compositions.

Twelve fertilizer treatments comprising three concentrations of each fertilizer composition (Milorganite (N—P—K, 6-2-0), urea (N—P—K, 46-0-0), LIQUID LYSINE (N—P—K, 10-2-1), and lysine (HCl) (N—P—K, 15-2-1)) were prepared and applied to 3 replications of ultra-dwarf Bermuda grass. The lysine (HCl) was dissolved in water prior to application. Each fertilizer treatment was applied in concentrations of 0.125 lb N/1000 ft$^2$/week, 0.25 lb N/1000 ft$^2$/week and 0.75 lb N/1000 ft$^2$/week. The urea, LIQUID LYSINE and lysine (HCl) were applied as foliar liquids, while Milorganite was applied as a granular fertilizer. Plot size was 1 m×1 m set up as a randomized complete block. Plots were mowed at 0.125 inches before fertilizer application. Irrigation (0.15 inch) was applied following application. Plots were rated for turfgrass quality and color (scale of 1-10 where 10=dark green turf, 1=dead/brown turf, and 6=initially acceptable turf) and phytotoxicity (scale of 0-5, where 5=worst, and 2=minimally objectionable) throughout the study period. Quality, color, and phytotoxicity were measured on 2 days before application (day −2) and day 2, day 5, day 15 and day 21 after application. All data was subject to statistical analysis and significant means were determined. Average turfgrass quality ratings for the treatments are presented in Table 12 and the quality results for application rates of 0.25 lb N/1000 ft$^2$/week are graphically presented in FIG. 6. Average turfgrass color ratings are presented in Table 13. Average phytotoxicity ratings are presented in Table 14. Average 2-month turfgrass quality rating for all fertilizer compositions is presented in FIG. 7.

TABLE 12

Quality Ratings - Dwarf Bermuda Grass

| Treatment | Weekly Rate (lbs N/1000 ft$^2$) | Day −2 | Day 2 | Day 5 | Day 15 | Day 21 |
|---|---|---|---|---|---|---|
| Milorganite | 0.125 | 6.7 | 6.8cd | 6.2e | 6.5def | 5.8d |
| Milorganite | 0.25 | 6.3 | 6.8cd | 6.7de | 6.2f | 5.8d |
| Milorganite | 0.75 | 6.5 | 6.7d | 6.5de | 6.5def | 6.2cd |
| Urea | 0.125 | 6.5 | 7.7abc | 7.5bc | 7.0bcd | 6.7abc |
| Urea | 0.25 | 6.3 | 7.7abc | 7.5bc | 7.0bcd | 6.8abc |
| Urea | 0.75 | 6.3 | 8.2a | 8.3a | 7.5ab | 7.3a |
| Lys (HCl) 15% N | 0.125 | 6.8 | 7.3bcd | 6.7de | 6.3ef | 6.2cd |
| Lys (HCl) 15% N | 0.25 | 6.5 | 7.2cd | 7.2cd | 7.2abc | 7.2ab |
| Lys (HCl) 15% N | 0.75 | 6.5 | 7.5abc | 7.5bc | 7.3abc | 6.8abc |
| Liquid Lys 10% N | 0.125 | 6.7 | 7.2cd | 7.2cd | 6.8cde | 6.5bc |
| Liquid Lys 10% N | 0.25 | 6.5 | 7.3bcd | 6.8cde | 7.0bcd | 7.0ab |
| Liquid Lys 10% N | 0.75 | 6.2 | 8.0ab | 8.0ab | 7.7a | 7.0ab |
| Significance | — | ns |  |  |  |  | ns and ** = P > 0.10 and P < 0.01 respectively.
Means with the same letter within a column are not significant according to Duncan's Multiple Range Test

TABLE 13

Color Rating - Dwarf Bermuda Grass

| Treatment | Weekly Rate (lbs N/1000 ft²) | Day −2 | Day 2 | Day 5 | Day 15 | Day 21 |
|---|---|---|---|---|---|---|
| Milorganite | 0.125 | 7.0 | 7.2bc | 6.7d | 6.7def | 6.0d |
| Milorganite | 0.25 | 6.7 | 7.3abc | 6.7d | 6.3f | 6.2d |
| Milorganite | 0.75 | 6.7 | 7.0c | 6.7d | 6.5ef | 6.5cd |
| Urea | 0.125 | 7.0 | 7.7ab | 7.7ab | 7.2bcd | 6.8bc |
| Urea | 0.25 | 6.7 | 7.7ab | 7.3abc | 7.3bc | 7.3ab |
| Urea | 0.75 | 6.8 | 7.8a | 7.8a | 8.0a | 7.8a |
| Lys (HCl) 15% N | 0.125 | 6.8 | 7.2bc | 7.0cd | 6.8c-f | 6.5cd |
| Lys (HCl) 15% N | 0.25 | 7.0 | 7.2bc | 7.2bcd | 7.2bcd | 7.3ab |
| Lys (HCl) 15% N | 0.75 | 6.7 | 7.3abc | 7.2bcd | 7.7ab | 7.2b |
| Liquid Lys 10% N | 0.125 | 7.0 | 7.3abc | 7.2bcd | 7.0cde | 7.0bc |
| Liquid Lys 10% N | 0.25 | 6.8 | 7.3abc | 7.0cd | 7.3bc | 7.3ab |
| Liquid Lys 10% N | 0.75 | 6.5 | 7.5abc | 7.3abc | 8.0a | 7.3ab |
| Significance | — | ns | * |  |  | ** | ns, * and ** = P > 0.10, P < 0.05 and P < 0.01 respectively.
Means with the same letter within a column are not significantly different according to Duncan's Multiple Range Test.

TABLE 14

Phytotoxicity - Dwarf Bermuda Grass

| Treatment | Weekly Rate (lbs N/1000 ft²) | Day −2 | Day 2 | Day 5 | Day 15 | Day 21 |
|---|---|---|---|---|---|---|
| Milorganite | 0.125 | 0 | 0 | 0 | 0 | 0 |
| Milorganite | 0.25 | 0 | 0 | 0 | 0 | 0 |
| Milorganite | 0.75 | 0 | 0 | 0 | 0 | 0 |
| Urea | 0.125 | 0 | 0 | 0 | 0 | 0 |
| Urea | 0.25 | 0 | 0 | 0 | 0 | 0 |
| Urea | 0.75 | 0 | 0 | 0 | 0 | 0 |
| Lys (HCl) 15% N | 0.125 | 0 | 0 | 0 | 0 | 0 |
| Lys (HCl) 15% N | 0.25 | 0 | 0 | 0 | 0 | 0 |
| Lys (HCl) 15% N | 0.75 | 0 | 0 | 0 | 0 | 0 |
| Liquid Lys 10% N | 0.125 | 0 | 0 | 0 | 0 | 0 |
| Liquid Lys 10% N | 0.25 | 0 | 0 | 0 | 0 | 0 |
| Liquid Lys 10% N | 0.75 | 0 | 0 | 0 | 0 | 0 |
| Significance | — | ns | ns | ns | ns | ns | ns = P > 0.10
Means with the same letter within a column are not significantly different according to Duncan's Multiple Range Test.

Both lysine based fertilizer treatments had quality and color results for green length ultra-dwarf Bermuda grass that were equivalent with those of urea and greater than those for milorganite for all levels of application. All fertilizer treatments showed no significant phytotoxicity at all three levels of application.

Example 12

In this Example, the effect of a fertilizer comprising lysine on turfgrass growth was examined. The effects of lysine (HCl) and LIQUID LYSINE on a common type of golf course greens quality turfgrass (creeping bentgrass for greens) were compared with those of CoRoN® brand fertilizer (commercially available from Helena Chemical Co., Collierville, Tenn.).

Nine fertilizer treatments comprising three concentrations of each fertilizer composition (Corono® (N—P—K, 14-2-14), LIQUID LYSINE (N—P—K, 10-2-1), and lysine (HCl) (N—P—K, 15-2-1)) were prepared and applied to 3 replications of creeping bentgrass for use on golf course greens. The lysine (HCl) (250 g) was dissolved in water (500 mL) prior to application. Each fertilizer treatment was applied in concentrations of 0.7 g N/m², 1.4 g N/m², and 2.8 g N/m². All applications were made using an Ortho Heavy Duty hand pump sprayer with all products being mixed with 126 mL of water for application. Plot size was 2 ft×6 ft set up as a randomized complete block. Irrigation was applied following application. Plots were rated for turfgrass quality and color (scale of 1-10 where 10=dark green turf, 1=dead/brown turf, and 6 minimally acceptable turf) and phytotoxicity (% burn) throughout the study period. Quality, color, and phytotoxicity were measured on day 7, day 14, day 2I1, day 28, day 35, and day 42 after application. All data was subject to statistical analysis and significant means were determined. Average turfgrass quality ratings for the treatments are presented in Table 15. Average turfgrass color ratings are presented in Table 16. Average phytotoxicity ratings (as % burn) are presented in Table 17.

TABLE 15

Quality Ratings - Creeping Bentgrass

| Treatment | Rate (g N/m²) | Day 7 | Day 14 | Day 21 | Day 28 | Day 35 | Day 42 |
|---|---|---|---|---|---|---|---|
| Coron | 0.7 | 5.7a | 8.0a | 7.0a | 6.7a | 6.3ab | 7.0a |
| Coron | 1.4 | 5.7a | 8.0a | 6.3a | 6.7a | 7.0a | 6.7a |
| Coron | 2.8 | 5.7a | 7.3ab | 6.3a | 7.0a | 6.3ab | 6.7a |

TABLE 15-continued

Quality Ratings - Creeping Bentgrass

| Treatment | Rate (g N/m$^2$) | Day 7 | Day 14 | Day 21 | Day 28 | Day 35 | Day 42 |
|---|---|---|---|---|---|---|---|
| Lys (HCl) 15% N | 0.7 | 5.3a | 6.3cd | 6.7a | 6.3a | 6.3ab | 7.0a |
| Lys (HCl) 15% N | 1.4 | 5.7a | 5.7de | 7.0a | 7.0a | 5.3cd | 6.7a |
| Lys (HCl) 15% N | 2.8 | 5.7a | 5.3e | 7.0a | 7.0a | 4.3d | 6.7a |
| Liquid Lys 10% N | 0.7 | 6.0a | 7.0bc | 6.3a | 6.7a | 6.7ab | 7.0a |
| Liquid Lys 10% N | 1.4 | 5.3a | 6.7bc | 6.7a | 7.0a | 6.0bc | 6.7a |
| Liquid Lys 10% N | 2.8 | 5.3a | 5.7de | 7.0a | 7.0a | 5.0de | 6.7a |

Means followed by same letter do not significantly differ P = .05, Duncan's New MRT

TABLE 16

Color Ratings - Creeping Bentgrass

| Treatment | Rate (gN/m$^2$) | Day 7 | Day 14 | Day 21 | Day 28 | Day 35 | Day 42 |
|---|---|---|---|---|---|---|---|
| Coron | 0.7 | 6.7a | 7.0a | 6.0a | 6.0ab | 6.3a | 7.0a |
| Coron | 1.4 | 6.3ab | 7.0a | 6.0a | 5.7b | 6.0ab | 7.7a |
| Coron | 2.8 | 6.3ab | 6.7ab | 6.7a | 6.7ab | 5.7ab | 7.3a |
| Lys (HCl) 15% N | 0.7 | 6.0abc | 6.0cd | 6.3a | 6.3ab | 6.3a | 7.3a |
| Lys (HCl) 15% N | 1.4 | 5.0c | 5.0e | 6.0a | 6.7ab | 5.7ab | 7.0a |
| Lys (HCl) 15% N | 2.8 | 5.3bc | 5.0e | 6.0a | 6.3ab | 5.0b | 6.3a |
| Liquid Lys 10% N | 0.7 | 5.7abc | 6.3bc | 6.3a | 6.3ab | 6.3a | 7.3a |
| Liquid Lys 10% N | 1.4 | 5.3bc | 5.7d | 6.3a | 6.7ab | 6.3a | 7.0a |
| Liquid Lys 10% N | 2.8 | 5.0c | 5.0e | 6.3a | 7.0a | 5.0b | 7.0a |

Means followed by same letter do not significantly differ P = .05, Duncan's New MRT

TABLE 17

Phytotoxicity (% Burn) - Creeping Bentgrass

| Treatment | Rate (gN/m$^2$) | Day 7 | Day 14 | Day 21 | Day 28 | Day 35 | Day 42 |
|---|---|---|---|---|---|---|---|
| Coron | 0.7 | 0.0b | 0.0e | 0.0e | 1.7b | 0.0d | 0.0c |
| Coron | 1.4 | 0.0b | 1.7de | 0.0e | 1.7b | 0.0d | 0.0c |
| Coron | 2.8 | 3.3b | 13.3cd | 5.0de | 8.3b | 11.7cd | 15.0bc |
| Lys (HCl) 15% N | 0.7 | 2.3b | 15.0c | 10.0d | 6.7b | 3.3d | 1.7c |
| Lys (HCl) 15% N | 1.4 | 15.0c | 58.3b | 51.7b | 18.3ab | 56.7b | 31.7b |
| Lys (HCl) 15% N | 2.8 | 36.7a | 78.3a | 73.3a | 35.0a | 83.3a | 78.3a |
| Liquid Lys 10% N | 0.7 | 8.3b | 6.7cde | 11.7d | 1.7b | 10.0cd | 0.0c |
| Liquid Lys 10% N | 1.4 | 10.7b | 18.3c | 21.7c | 8.3b | 23.3c | 13.3bc |
| Liquid Lys 10% N | 2.8 | 15.0b | 48.3b | 60.0b | 23.3ab | 75.0a | 63.3a |

Means followed by same letter do not significantly differ P = .05, Duncan's New MRT The lysine based fertilizer compositions showed acceptable turf qualities at application rates lower than 0.5 lb N/1000 ft$^2$ applied with less than 2.0 gal H$_2$O/1000 ft$^2$. If used strictly as a foliar treatment (i.e., foliage wetted), higher application rates have the potential to result in foliar burn.

Example 13

In this Example, the effect of a fertilizer comprising lysine on turfgrass growth was examined. The effects of lysine (HCl) and LIQUID LYSINE on a common type of golf course fairway quality turfgrass (Bermuda green) were compared with those of CoRoN® brand fertilizer.

Six fertilizer treatments comprising two concentrations of each fertilizer composition (Coron® (N—P—K, 14-2-14), LIQUID LYSINE (N—P—K, 10-2-1), and lysine (HCl) (N—P—K, 15-2-1)) were prepared and applied to 3 replications of Bermuda grass for use on golf course fairways. The lysine (HCl) was applied as a granular using a Scotts 2 foot drop spreader on a setting of 4.5. The solutions of LIQUID LYSINE and Coran were applied using a Birchmeier backpack sprayer with a 5 foot spray pattern. Each fertilizer treatment was applied in concentrations 3.0 lb N/1000 ft$^2$ and 6.0 lb N/1000 ft$^2$. Plot size was 5 ft×60 ft set up as a randomized complete block. Irrigation was applied following application, Plots were rated for turfgrass quality and color (scale of 1-10 where 10=dark green turf 1=dead/brown turf and 6=minimally acceptable turf) and phytotoxicity (% burn) throughout the study period and compared with two untreated plots. Quality, color, and phytotoxicity were measured on day 7, day 14, day 21, day 28, day 35, and day 42 after application. All data was subject to statistical analysis and significant means were determined. Average turfgrass quality ratings for the treatments are presented in Table 18. Average turfgrass color ratings are presented in Table 19. Average phytotoxicity ratings (as % bum) are presented in Table 20.

TABLE 18

Quality Ratings - Bermuda grass

| Treatment | Rate (lb N/1000 ft$^2$) | Day 7 | Day 12 | Day 19 | Day 26 | Day 33 | Day 40 | Day 47 |
|---|---|---|---|---|---|---|---|---|
| Coron | 3.0 | 6.0ab | 6.3bc | 7.3ab | 7.3ab | 7.7a | 7.0b | 7.3ab |
| Coron | 6.0 | 6.3ab | 7.0abc | 8.0a | 8.0a | 8.0a | 7.7a | 8.0a |
| Lys (HCl) 15% N | 3.0 | 6.7a | 7.3ab | 7.3ab | 7.7ab | 8.0a | 7.0b | 7.3ab |
| Lys (HCl) 15% N | 6.0 | 6.7a | 7.3ab | 7.3ab | 7.7ab | 7.7a | 7.0b | 7.7a |
| Liquid Lys 10% N | 3.0 | 5.7b | 6.3bc | 7.0b | 7.0b | 7.3a | 6.0c | 6.7bc |
| Liquid Lys 10% N | 6.0 | 6.7a | 7.7a | 7.7ab | 8.0a | 8.0a | 5.3d | 6.3c |

TABLE 18-continued

Quality Ratings - Bermuda grass

| Treatment | Rate (lb N/1000 ft²) | Day 7 | Day 12 | Day 19 | Day 26 | Day 33 | Day 40 | Day 47 |
|---|---|---|---|---|---|---|---|---|
| Untreated | — | 5.7b | 6.0c | 7.0b | 7.7ab | 8.0a | 8.0a | 8.0a |
| Untreated | — | 5.7b | 6.7abc | 7.0b | 7.0b | 8.0a | 8.0a | 8.0a |

Means followed by same letter do not significantly differ P = .05, Duncan's New MRT

TABLE 19

Color Ratings - Bermuda grass

| Treatment | Rate (lb N/1000 ft²) | Day 7 | Day 12 | Day 19 | Day 26 | Day 33 | Day 40 | Day 47 |
|---|---|---|---|---|---|---|---|---|
| Coron | 3.0 | 5.0b | 6.0b | 6.7a | 7.3a | 7..3ab | 7.3ab | 7.3ab |
| Coron | 6.0 | 6.0a | 7.0a | 7.0a | 8.0a | 8.0a | 7.0b | 7.7ab |
| Lys (HCl) 15% N | 3.0 | 5.7ab | 6.0b | 6.7a | 7.3a | 7.7ab | 7.0b | 7.0bc |
| Lys (HCl) 15% N | 6.0 | 5.3ab | 6.7a | 7.0a | 7.7a | 7.7ab | 7.3ab | 7.3ab |
| Liquid Lys 10% N | 3.0 | 5.3ab | 5.7bc | 6.3a | 7.0a | 7.0b | 6.0c | 7.0bc |
| Liquid Lys 10% N | 6.0 | 5.7ab | 6.7a | 7.0a | 7.3a | 8.0a | 5.3c | 6.3c |
| Untreated | — | 5.0b | 5.3c | 6.3a | 7.0a | 7.7ab | 8.0a | 8.0a |
| Untreated | — | 5.3ab | 5.7bc | 6.7a | 7.0a | 7.0b | 7.7ab | 8.0a |

Means followed by same letter do not significantly differ P = .05, Duncan's New MRT

TABLE 20

Phytotoxicity (% Burn) - Bermuda grass

| Treatment | Rate (lb N/1000 ft²) | Day 7 | Day 12 | Day 19 | Day 26 | Day 33 | Day 40 | Day 47 |
|---|---|---|---|---|---|---|---|---|
| Coron | 3.0 | 3.3de | 0.0c | 0.0c | 0.0b | 0.0a | 0.0c | 0.0c |
| Coron | 6.0 | 15.0b | 5.0b | 1.7bc | 0.0b | 0.0a | 0.0c | 0.0c |
| Lys (HCl) 15% N | 3.0 | 11.7bc | 6.7b | 1.7bc | 0.0b | 0.0a | 0.0c | 0.0c |
| Lys (HCl) 15% N | 6.0 | 21.7a | 11.7a | 5.0b | 0.0b | 0.0a | 0.0c | 0.0c |
| Liquid Lys 10% N | 3.0 | 8.3cd | 3.3bc | 0.0c | 0.0b | 0.0a | 11.7b | 3.3b |
| Liquid Lys 10% N | 6.0 | 26.7a | 15.0a | 8.3a | 3.3a | 0.0a | 26.7a | 16.7a |
| Untreated | — | 0.0e | 0.0c | 0.0c | 0.0b | 0.0a | 0.0c | 0.0c |
| Untreated | — | 0.0e | 0.0c | 0.0c | 0.0b | 0.0a | 0.0c | 0.0c |

Means followed by same letter do not significantly differ P = .05, Duncan's New MRT The lysine based fertilizer compositions showed acceptable turf qualities at application rates lower than 6.0 lb N/1000 ft² applied with less than 2.0 gal H₂O/1000 ft². If strictly as a foliar treatment (i.e., foliage wetted), higher application rates have the potential to result in foliar burn.

Example 14

In this Example, the effect of a fertilizer comprising lysine on turfgrass growth was examined. The effects of lysine (HCl) and LIQUID LYSINE on a common type of lawn quality turfgrass (rhizomatous tall fescue) were compared with those of CoRoN® brand fertilizer.

Six fertilizer treatments comprising two concentrations of each fertilizer composition (Coron® (N—P—K, 14-2-34), LIQUID LYSINE (N—P—K, 10-2-1), and lysine (HCl) (N—P—K, 15-2-1)) were prepared and applied to 3 replications of rhizomatous tall fescue grass. The solutions of lysine (HCl) (dissolved in 0.5 gal water), LIQUID LYSINE and Coran were applied using a Birchmeier backpack sprayer with a 5 foot spray pattern, Each fertilizer treatment was applied in either a 3-split application with an application rate of 2 lb N/1000 ft² or a 6-split application with an application rate of 1 lb N/1000 ft². Plot size was 9 ft×9 ft set up as a randomized complete block. Irrigation was applied following application. Plots were rated for turfgrass quality and color (scale of 1-10 where 10=dark green turf, 1=dead/brown turf, and 6=minimally acceptable turf and phytotoxicity (% burn) throughout the study period and compared with two untreated plots. Quality, color, and phytotoxicity were measured on day 7, day 14, day 21, day 28, day 35, and day 42 after application. All data was subject to statistical analysis and significant means were determined. Average turfgrass quality ratings for the treatments are presented in Table 21. Average turfgrass color ratings are presented in Table 22. Average phytotoxicity ratings (as % burn) are presented in Table 23.

TABLE 21

Quality Ratings - Tall fescue grass

| Treatment | Rate (lb N/1000 ft²) | Day 7 | Day 14 | Day 21 | Day 28 | Day 35 |
|---|---|---|---|---|---|---|
| Coron (6-split) | 1.0 | 7.0b | 7.3b | 8.0a | 8.0a | 8.0a |
| Coron (3-split) | 2.0 | 7.0b | 7.3b | 8.0a | 8.0a | 8.0a |
| Lys (HCl) 15% N (6-split) | 1.0 | 6.0c | 7.0b | 7.7a | 8.0a | 8.0a |
| Lys (HCl) 15% N (3-split) | 2.0 | 5.7c | 7.0b | 7.0b | 8.0a | 8.0a |
| Liquid Lys 10% N (6-split) | 1.0 | 5.0d | 6.0c | 7.0b | 7.3b | 8.0a |
| Liquid Lys 10% N (3-split) | 2.0 | 5.0d | 5.7c | 6.7b | 7.0b | 8.0a |
| Untreated (6-split) | — | 8.0a | 8.0a | 8.0a | 8.0a | 8.0a |
| Untreated (3-split) | — | 8.0a | 8.0a | 8.0a | 8.0a | 8.0a |

Means followed by same letter do not significantly differ P = .05, Duncan's New MRT

TABLE 22

Color Ratings - Tall fescue grass

| Treatment | Rate (lb N/1000 ft²) | Day 7 | Day 14 | Day 21 | Day 28 | Day 35 |
|---|---|---|---|---|---|---|
| Coron (6-split) | 1.0 | 6.3b | 7.0a | 7.7ab | 8.0a | 8.0a |
| Coron (3-split) | 2.0 | 6.3b | 7.0a | 7.7ab | 8.0a | 8.0a |
| Lys (HCl) 15% N (6-split) | 1.0 | 6.0c | 7.0a | 7.0bc | 8.0a | 8.0a |
| Lys (HCl) 15% N (3-split) | 2.0 | 5.0d | 6.0b | 7.0bc | 8.0a | 8.0a |
| Liquid Lys 10% N (6-split) | 1.0 | 5.0d | 5.7b | 6.3cd | 7.3b | 8.0a |
| Liquid Lys 10% N (3-split) | 2.0 | 4.0e | 5.0c | 6.0d | 7.0b | 7.0b |
| Untreated (6-split) | — | 7.0a | 7.0a | 8.0a | 8.0a | 8.0a |
| Untreated (3-split) | — | 7.0a | 7.0a | 8.0a | 8.0a | 8.0a |

Means followed by same letter do not significantly differ P = .05, Duncan's New MRT

TABLE 23

Phytotoxicity (% Burn) - Tall fescue grass

| Treatment | Rate (lb N/1000 ft²) | Day 7 | Day 14 | Day 21 | Day 28 | Day 35 |
|---|---|---|---|---|---|---|
| Coron (6-split) | 1.0 | 3.3d | 1.7bc | 0.0b | 0.0a | 0.0a |
| Coron (3-split) | 2.0 | 8.3c | 1.7bc | 0.0b | 0.0a | 0.0a |
| Lys (HCl) 15% N (6-split) | 1.0 | 10.0c | 1.7bc | 0.0b | 0.0a | 0.0a |
| Lys (HCl) 15% N (3-split) | 2.0 | 15.0b | 6.7b | 1.7b | 0.0a | 0.0a |
| Liquid Lys 10% N (6-split) | 1.0 | 13.3b | 6.7b | 1.7b | 0.0a | 0.0a |
| Liquid Lys 10% N (3-split) | 2.0 | 23.3a | 16.7a | 6.7a | 1.7a | 0.0a |
| Untreated (6-split) | — | 0.0d | 0.0c | 0.0b | 0.0a | 0.0a |
| Untreated (3-split) | — | 0.0d | 0.0c | 0.0b | 0.0a | 0.0a |

Means followed by same letter do not significantly differ P = .05, Duncan's New MRT The lysine based fertilizer compositions showed acceptable turf qualities at application rates lower than 2.0 lb N/1000 ft² applied with less than 2.0 gal H₂O/1000 ft². If used strictly as a foliar treatment (i.e., foliage wetted), higher application rates have the potential to result in foliar burn.

Example 15 (Illinois Fairway)

In this Example, the effect of a fertilizer comprising lysine on cool season fairway turfgrass growth was examined. The effects of lysine (HCl) and LIQUID LYSINE on a common type of golf course fairway variety turfgrass (Pennlinks creeping bentgrass maintained as a golf fairway) were compared with those of urea, Milorganite and a blended fertilizer (a blend of methylene urea and urea in an approximately 1:1 ratio).

Fifteen fertilizer treatments comprising three concentrations of each fertilizer composition (Milorganite (N—P—K, 6-2-0), urea (N—P—K, 46-0-0), a blended fertilizer, LIQUID LYSINE (N—P—K, 10-2-1), and lysine (HCl) (N—P—K, 15-2-1)) were prepared and applied to 3 replications of a well established Pennlinks creeping bentgrass maintained as a golf fairway grass. The urea, lysine (HCl), and LIQUID LYSINE were dissolved/suspended in 1.5 gal water prior to application. Each fertilizer treatment was applied in concentrations of 0.5 lb N/1000 ft² 1 month, 1.0 lb N/1000 ft²/month and 3.0 lb N/1000 ft²/month. The urea, LIQUID LYSINE and lysine (HCl) were applied as foliar liquids, while Milorganite and the blended fertilizer were applied as granular fertilizers. Plot size was 4 ft×8 ft laid out in a replicated complete block design. Plots were mowed at 0.5 inches before fertilizer application and mowed three times per week to 0.5 inch height. Grass clippings were not removed from the plots and no supplemental cultural maintenance was applied. Irrigation (0.15 inch) was applied following application and every other day thereafter. Plots were rated for turfgrass quality (scale of 1-9 where 9=dark green turf, 1=dead/brown turf, and 6=minimally acceptable turf and phytotoxic injury (scale of 0-9 where 9=significant foliar injury and 2=minimally objectional foliar injury) throughout the study period. Quality was measured prior to application (day 0) and day 37, day 70 and day 95 after application. Injury was measured on day 37, day 70 and day 95 after application. All data was subject to statistical analysis and significant means were determined. Average turfgrass quality ratings for the treatments are presented in Table 24. Average turfgrass injury ratings are presented in Table 25.

TABLE 24

Quality Rating - Fairway Bentgrass

| Treatment | Weekly Rate (lbs N/1000 ft$^2$) | Day 0 | Day 37 | Day 70 | Day 95 |
|---|---|---|---|---|---|
| No treatment | 0.0 | 5.0b | 5.7b | 5.3 | 6.7b |
| Milorganite | 0.5 | 6.3a | 6.3ab | 6.0 | 7.0a |
| Milorganite | 1.0 | 6.7a | 6.0ab | 5.7 | 7.0a |
| Milorganite | 3.0 | 6.7a | 6.7ab | 6.3 | 7.0a |
| Urea | 0.5 | 6.7a | 6.7ab | 6.0 | 7.0a |
| Urea | 1.0 | 7.0a | 7.0a | 6.7 | 7.0a |
| Urea | 3.0 | 6.3a | 7.0a | 6.0 | 7.0a |
| Lys (HCl) 15% N | 0.5 | 6.3a | 6.0ab | 6.0 | 7.0a |
| Lys (HCl) 15% N | 1.0 | 7.0a | 7.0a | 5.7 | 7.0a |
| Lys (HCl) 15% N | 3.0 | 7.0a | 6.7ab | 5.7 | 7.0a |
| Liquid Lys 10% N | 0.5 | 6.7a | 6.7ab | 6.7 | 7.0a |
| Liquid Lys 10% N | 1.0 | 6.7a | 7.0a | 5.7 | 7.0a |
| Liquid Lys 10% N | 3.0 | 6.7a | 6.7ab | 5.3 | 7.0a |
| Blended fertilizer | 0.5 | 6.3a | 6.7ab | 5.7 | 7.0a |
| Blended fertilizer | 1.0 | 6.7a | 5.7b | 6.0 | 7.0a |
| Blended fertilizer | 3.0 | 6.7a | 7.0a | 5.7 | 7.0a |

Means with the same letter within a column are not significant according to Duncan's Multiple Range Test

TABLE 25

Injury Rating - Fairway Bentgrass

| Treatment | Weekly Rate (lbs N/1000 ft$^2$) | Day 37 | Day 70 | Day 95 |
|---|---|---|---|---|
| No treatment | 0.0 | 1.0b | 6.3 | 1.3c |
| Milorganite | 0.5 | 1.3ab | 5.3 | 2.7bc |
| Milorganite | 1.0 | 1.0b | 5.3 | 1.7c |
| Milorganite | 3.0 | 1.0b | 5.7 | 2.0bc |
| Urea | 0.5 | 1.3ab | 6.3 | 2.0bc |
| Urea | 1.0 | 1.3ab | 6.0 | 1.3c |
| Urea | 3.0 | 1.0b | 5.7 | 4.3a |
| Lys (HCl) 15% N | 0.5 | 1.3ab | 5.7 | 2.0bc |
| Lys (HCl) 15% N | 1.0 | 1.0b | 5.0 | 3.0abc |
| Lys (HCl) 15% N | 3.0 | 2.0a | 4.7 | 2.0bc |
| Liquid Lys 10% N | 0.5 | 1.0b | 6.0 | 1.7c |
| Liquid Lys 10% N | 1.0 | 1.0b | 5.7 | 2.0bc |
| Liquid Lys 10% N | 3.0 | 1.0b | 5.3 | 2.0bc |
| Blended fertilizer | 0.5 | 1.0b | 5.0 | 3.0abc |
| Blended fertilizer | 1.0 | 1.0b | 6.7 | 2.0bc |
| Blended fertilizer | 3.0 | 1.3ab | 5.0 | 3.7ab |

Means with the same letter within a column are not significant according to Duncan's Multiple Range Test Both lysine based fertilizer treatments had similar performance in quality and injury results for fairway variety creeping bentgrass with those of urea, milorganite, and blended inorganic fertilizer for all levels of application. The performance of the lysine based fertilizers indicates that they have the same residual activities and the other materials.

Example 16

In this Example, the effect of a fertilizer comprising lysine on cool season greens quality turfgrass growth was examined. The effects of lysine (HCl) and LIQUID LYSINE on a common type of golf course greens quality turfgrass (Pennlinks creeping bentgrass for greens, mown at 0.1875 in height of cut) were compared with those of urea, Milorganite and a blended fertilizer (a blend of methylene urea and urea in an approximately 1:1 ratio).

Fifteen fertilizer treatments comprising three concentrations of each fertilizer composition (Milorganite (N—P—K, 6-2-0), urea (N—P—K, 46-0-0), a blended fertilizer, LIQUID LYSINE N—P—K, 10-2-1), and lysine (HCl) (N—P—K, 15-2-1)) were prepared and applied to 3 replications of well established Pennlinks creeping bentgrass mown to 0.1875 in height cut. The urea, lysine (HCl), and LIQUID LYSINE were dissolved/suspended in 1.5 gal water prior to application. Each fertilizer treatment was applied in concentrations of 0.125 lb N/1000 ft$^2$/week, 0.250 lb N/1000 ft$^2$/week and 0.750 lb N/1000 ft$^2$/week. The urea, LIQUID LYSINE and lysine (HCl) were applied as foliar liquids, while Milorganite and blended fertilizer were applied as granular fertilizers. Plot size was 4 ft×8 ft laid out in a replicated complete block design. Plots were mowed at 0.1875 inches height before fertilizer application and mowed five times per week to 0.1875 inch height. Grass clippings were removed from the plots after each mowing. Irrigation (0.15 inch) was applied following application and daily thereafter. Plots were rated for turfgrass quality (scale of 1-9 where 9=dark green turf, 1=dead/brown turf, and 6=minimally acceptable turf) and phytotoxic injury (scale of 0-9 where 9=significant foliar injury and 2=minimally objectionable foliar injury) throughout the study period. Quality was measured prior to application (day 0) and day 37, day 70 and day 95 after application. Injury was measured on day 37, day 70 and day 95 after application. Ai) additional set of turfgrass plots were fertilized with three treatments of a soy concentrate fertilizer with the same application rates and methods. The quality and phytotoxic injury of the soy concentrate fertilizer plots were measured on day 95. All data was subject to statistical analysis and significant means were determined. Average turfgrass quality ratings for the treatments are presented in Table 26. Average turfgrass injury ratings are presented in Table 27.

TABLE 26

Quality Rating - Greens Bentgrass

| Treatment | Weekly Rate (lbs N/1000 ft$^2$) | Day 0 | Day 37 | Day 70 | Day 95 |
|---|---|---|---|---|---|
| No treatment | 0.0 | 4.0e | 3.3g | 4.3e | 4.7c |
| Milorganite | 0.125 | 4.3de | 3.7fg | 5.0d | 5.7b |
| Milorganite | 0.25 | 4.3de | 4.7ef | 5.7c | 6.0ab |
| Milorganite | 0.75 | 4.0e | 6.0bcd | 6.0bc | 6.7ab |
| Urea | 0.125 | 4.3de | 4.7ef | 5.7c | 5.7b |
| Urea | 0.25 | 5.0bc | 6.3bc | 6.0bc | 6.0ab |
| Urea | 0.75 | 5.3b | 8.0a | 7.0a | 6.7ab |
| Lys (HCl) 15% N | 0.125 | 4.7cd | 5.0de | 6.0bc | 6.0ab |
| Lys (HCl) 15% N | 0.25 | 4.7cd | 6.0bcd | 6.0bc | 6.3ab |
| Lys (HCl) 15% N | 0.75 | 6.0a | 7.0ab | 7.0a | 7.0a |
| Liquid Lys 10% N | 0.125 | 4.0e | 4.7ef | 5.7c | 5.7b |
| Liquid Lys 10% N | 0.25 | 4.0e | 6.3bc | 5.7c | 6.0ab |
| Liquid Lys 10% N | 0.75 | 4.7cd | 8.0a | 7.0a | 6.3ab |
| Blended fertilizer | 0.125 | 4.3de | 4.7ef | 5.0d | 5.7b |
| Blended fertilizer | 0.25 | 4.3de | 5.3cde | 5.7c | 6.0ab |
| Blended fertilizer | 0.75 | 5.3b | 7.7a | 6.3b | 6.3ab |
| Soy Concentrate | 0.125 | — | — | — | 6.0 |
| Soy Concentrate | 0.25 | — | — | — | 5.3 |
| Soy Concentrate | 0.75 | — | — | — | 6.0 |

Means with the same letter within a column are not significant according to Duncan's Multiple Range Test

TABLE 27

Injury Rating - Greens Bentgrass

| Treatment | Weekly Rate (lbs N/1000 ft²) | Day 37 | Day 70 | Day 95 |
|---|---|---|---|---|
| No treatment | 0.0 | 1.0b | 1.0 | 2.3ab |
| Milorganite | 0.125 | 1.0b | 1.0 | 2.0ab |
| Milorganite | 0.25 | 1.7ab | 1.0 | 2.0ab |
| Milorganite | 0.75 | 1.0b | 1.0 | 1.3b |
| Urea | 0.125 | 1.0b | 1.3 | 3.0ab |
| Urea | 0.25 | 1.0b | 1.0 | 2.0ab |
| Urea | 0.75 | 1.0b | 1.0 | 2.7ab |
| Lys (HCl) 15% N | 0.125 | 1.0b | 1.0 | 2.3ab |
| Lys (HCl) 15% N | 0.25 | 1.0b | 1.0 | 2.7ab |
| Lys (HCl) 15% N | 0.75 | 2.0a | 1.3 | 2.3ab |
| Liquid Lys 10% N | 0.125 | 1.0b | 1.0 | 2.3ab |
| Liquid Lys 10% N | 0.25 | 1.0b | 1.0 | 1.7ab |
| Liquid Lys 10% N | 0.75 | 1.0b | 1.0 | 1.7ab |
| Blended fertilizer | 0.125 | 1.3ab | 1.0 | 3.3ab |
| Blended fertilizer | 0.25 | 1.3ab | 1.3 | 3.0ab |
| Blended fertilizer | 0.75 | 1.0b | 1.3 | 3.7a |
| Soy Concentrate | 0.125 | — | — | 3.0 |
| Soy Concentrate | 0.25 | — | — | 3.7 |
| Soy Concentrate | 0.75 | — | — | 2.7 |

Means with the same letter within a column are not significant according to Duncan's Multiple Range Test Both lysine based fertilizer treatments had quality ratings for green length creeping bentgrass that were equivalent with those of urea and superior to those for milorganite for all levels of application. All fertilizer treatments showed no significant phytotoxic injury at all three levels of application.

Example 17

In this Example, the effect of a fertilizer comprising lysine on cool season lawn variety turfgrass growth was examined. The effects of lysine (HCl) and LIQUID LYSINE on a common variety of law turfgrass (Moonlight Kentucky bluegrass) were compared with those of urea, Milorganite and a blended fertilizer (a blend of methylene urea and urea in an approximately 1:1 ratio).

Fifteen fertilizer treatments comprising three concentrations of each fertilizer composition (Milorganite N—P—K, 6-2-0), urea (N—P—K, 46-0-0), a blended fertilizer, LIQUID LYSINE (N—P—K, 10-2-1), and lysine (HCl) (N—P—K, 15-2-1)) were prepared and applied to 3 replications of newly established "Moonlight" variety Kentucky bluegrass lawn turfgrass. The urea, lysine (HCl), and LIQUID LYSINE were dissolved/suspended in 1.5 gal water prior to application. Each fertilizer treatment was applied in concentrations of 0.5 lb N/1000 ft²/year, 1.0 lb N/1000 ft²/year and 3.0 lb N/1000 ft²/year, The urea, LIQUID LYSINE and lysine (HCl) were applied as foliar liquids, while Milorganite and the blended fertilizer were applied as granular fertilizers. Plot size was 4 ft×8 ft laid out in a replicated complete block design. Plots were mowed at 2.0 inches before fertilizer application and mowed two times per week to 2.0 inch height. Grass clippings were not removed from the plots and no supplemental cultural maintenance or pest management was applied. Irrigation (0.15 inch) was applied following application and thereafter only when necessary to insure survival of the turf. Plots were rated for turfgrass quality (scale of 1-9 where 9=dark green turf, 1=dead/brown turf, and 6=minimally acceptable turf) and phytotoxic injury (scale of 0-9 where 9=significant foliar injury and 2=minimally objectionable foliar injury) throughout the study period. Quality was measured prior to application (day 0) and day 37, day 70 and day 95 after application. Injury was measured on day 37 and day 70 after application. In addition, blade density of the grass was measured on day 70 after application (scale of 1-9, where 9=very dense turf, 1=low density turf). All data was subject to statistical analysis and significant means were determined. Average turfgrass quality ratings for the treatments are presented in Table 28. Average turfgrass injury ratings and average density on day 70 are presented in Table 29.

TABLE 28

Quality Rating - Kentucky Bluegrass

| Treatment | Weekly Rate (lbs N/ 1000 ft²) | Day 0 | Day 37 | Day 70 | Day 95 |
|---|---|---|---|---|---|
| No treatment | 0.0 | 4.0e | 3.3c | 2.7e | 3.3b |
| Milorganite | 0.5 | 5.0cde | 5.7b | 5.0bc | 6.0a |
| Milorganite | 1.0 | 5.7abcd | 6.0b | 5.3bc | 5.3ab |
| Milorganite | 3.0 | 6.7a | 8.0a | 6.7a | 4.7ab |
| Urea | 0.5 | 4.7de | 6.0b | 4.3cd | 4.3ab |
| Urea | 1.0 | 5.0cde | 7.7a | 5.3bc | 6.3a |
| Urea | 3.0 | 6.3ab | 8.0a | 6.7a | 4.3ab |
| Lys (HCl) 15% N | 0.5 | 5.0cde | 5.3b | 4.3cd | 5.7ab |
| Lys (HCl) 15% N | 1.0 | 5.3bcd | 7.3a | 6.0ab | 6.0a |
| Lys (HCl) 15% N | 3.0 | 6.3ab | 8.0a | 6.7a | 5.7ab |
| Liquid Lys 10% N | 0.5 | 4.0e | 6.0b | 4.3cd | 4.7ab |
| Liquid Lys 10% N | 1.0 | 4.7de | 7.3a | 5.3bc | 5.7ab |
| Liquid Lys 10% N | 3.0 | 6.0abc | 7.7a | 7.0a | 6.0a |
| Blended fertilizer | 0.5 | 4.7de | 5.0b | 3.7de | 4.3ab |
| Blended fertilizer | 1.0 | 5.3bcd | 7.3a | 5.0bc | 6.3a |
| Blended fertilizer | 3.0 | 6.7a | 8.0a | 7.0a | 5.3ab |

Means with the same letter within a column are not significant according to Duncan's Multiple Range Test

TABLE 29

Injury/Density Rating - Kentucky Bluegrass

| Treatment | Weekly Rate (lbs N/1000 ft²) | Day 37 Injury | Day 70 Injury | Day 70 Density |
|---|---|---|---|---|
| No treatment | 0.0 | 1.0e | 2.3d | 4.7e |
| Milorganite | 0.5 | 1.3e | 5.7bc | 6.0bcd |
| Milorganite | 1.0 | 1.0e | 57bc | 6.3abc |
| Milorganite | 3.0 | 1.0e | 7.3a | 7.3a |
| Urea | 0.5 | 1.0e | 5.0c | 5.0de |
| Urea | 1.0 | 1.3e | 5.7bc | 5.3cde |
| Urea | 3.0 | 3.3bc | 7.0ab | 7.0ab |
| Lys (HCl) 15% N | 0.5 | 1.7de | 5.0c | 5.3cde |
| Lys (HCl) 15% N | 1.0 | 2.7cd | 6.0abc | 6.3abc |
| Lys (HCl) 15% N | 3.0 | 6.3a | 7.0ab | 7.0ab |
| Liquid Lys 10% N | 0.5 | 1.3e | 5.7bc | 5.3cde |
| Liquid Lys 10% N | 1.0 | 1.3e | 6.0abc | 6.0bcd |
| Liquid Lys 10% N | 3.0 | 4.0b | 6.7ab | 6.7ab |
| Blended fertilizer | 0.5 | 1.0e | 5.0c | 5.3cde |
| Blended fertilizer | 1.0 | 1.3e | 5.7bc | 6.0bcd |
| Blended fertilizer | 3.0 | 2.0de | 7.0ab | 7.3a |

Means with the same letter within a column are not significant according to Duncan's Multiple Range Test Both lysine based fertilizer treatments had quality ratings for lawn length Kentucky bluegrass that were equivalent with those of urea, milorganite and blended inorganic fertilizer for all levels of application. Materials applied at 3 times the normal application rate (i.e., 3.0 lbs N/1000 ft²) resulted in the best turfgrass qualities.

Example 18

In this Example, the effect of organic fertilizers comprising fermentation biomass compositions on turfgrass growth and color was examined. Fertilizer treatments included fermentation biomasses including lysine sulfate, a citric acid fermentation biomass, and a biomass by-product from a polyhydroxyalkanoate (PHA) production process.

Six fertilizer treatments comprising two concentrations of each fertilizer composition (lysine sulfate, citric acid fermentation biomass and PHA production biomass) were prepared and applied to Kentucky bluegrass turfgrass. Control plots having no fertilizer application were also prepared. Plot size was 2 ft by 5 ft. The lysine sulfate was applied in an amount of 1.0 lb N/1000 ft$^2$ and 3.0 lb N/1000 ft$^2$ (45 g and 135 g of lysine sulfate, respectively were applied to the plots). The citric acid fermentation biomass comprised Citristim® (commercially available from Archer-Daniels-Midland Company, Decatur, Ill.) and was applied in an amount of 1.0 lb N/1000 ft$^2$ and 3.0 lb N/1000 ft$^2$ (65 g and 196 g of Citristim®, respectively were applied to the plots). Analysis of the Citristim product is presented in Table 30.

TABLE 30

| Citristim ® Analysis | |
| --- | --- |
| Component | Percent (wt) |
| Dry Matter, % | 88 |
| Protein, % | 40 |
| Fat, % | 8.2 |
| Crude Fiber, % | 0.5 |
| Lysine, % | 3.1 |
| Methionine, % | 0.74 |
| Total Sulfur Amino Acids, % | 1.12 |
| Threonine, % | 1.95 |
| Tryptophan, % | 0.54 |
| Calcium, % | 0.13 |
| Phosphorus, % | 0.27 |
| Ash, % | 2.0 |

The PHA production biomass was applied in an amount of 1.0 lb N/1000 ft$^2$ and 3.0 lb N/1000 ft$^2$ (84 g and 252 g of PHA biomass, respectively were applied to the plots). Irrigation was applied following application. Plots were rated for turfgrass growth (scale of 1-9, 9=greatest growth) and color (scale 1-9, 9=dark green color) and compared to three untreated plots. Growth and color were evaluated on the tenth day after application of the fertilizer compositions. Average turfgrass growth and color ratings are presented in Table 31.

TABLE 31

| Turfgrass Rating for Fermentation Biomass Fertilizer Application | | | |
| --- | --- | --- | --- |
| Treatment | Application Rate (lb N/1000 ft$^2$) | Growth | Color |
| Lysine sulfate control (no treatment) | 0 | 4 | 5 |
| Lysine sulfate low application | 1.0 | 6.5 | 6.5 |
| Lysine sulfate high application | 3.0 | 7 | 7 |
| Citristim control (no treatment) | 0 | 4.5 | 5.5 |
| Citristim low application | 1.0 | 5.5 | 7 |
| Citristim high application | 3.0 | 7 | 7 |
| PHA production biomass control (no treatment) | 0 | 4 | 4 |
| PHA production biomass low application | 1.0 | 6 | 6 |
| PHA production biomass high application | 3.0 | 7 | 8 |

Each of the treated plots had noticeably better growth and color on turf treated at the low application rate. The turf plots treated at the high application rate showed improved growth ratings and were noticeably darker green in color. All of the untreated plots showed little or no growth and had a poor or light green color. Mowing injury was evident in the untreated turf on a large number of leaf blades, which resulted in light tan blade tips. No mowing injury was observed in any of the plots treated with the fertilizer compositions.

Example 19

In this Example various plant protein products suitable for use in various non-limiting embodiments of the fertilizers described herein were analyzed for content of various components. The composition of the various plant proteins are presented in Tables 32 and 33. The composition of B-Starch is also presented in Table 33.

TABLE 32

| Soy Protein Analysis (weight percent or ppm) | | | | | | | | |
| --- | --- | --- | --- | --- | --- | --- | --- | --- |
| Component | Soybean Meal (44%) | Soybean Meal (dehulled) | Soy Hulls | Soy Flour | Soy Protein Concentrate | Soy Protein Isolate (Ardex) | Soy Oil | Soybean Feed (Arsoy) |
| Dry matter | 89.0% | 90.0% | 91.0% | 90.0% | 90.0% | 92.0% | 100.0% | 90.0% |
| Crude Protein | 43.8% | 47.5% | 11.0% | 50.0% | 64.0% | 85.8% | | 32.0% |
| % Nitrogen | 7.0% | 7.6% | 1.8% | 8.0% | 10.2% | 13.7% | | 5.1% |
| Fat | 0.5% | 1.0% | 1.9% | 0.8% | 0.6% | 0.6% | 99.5% | 0.1% |
| Fiber | 7.0% | 3.0% | 36.5% | 3.0% | 4.0% | 1.0% | | 12.0% |
| Ash | 6.4% | 6.0% | 4.6% | 5.0% | 6.5% | 6.0% | | 4.0% |
| Calcium | 0.32% | 0.34% | 0.45% | 0.32% | 0.35% | 0.15% | | 0.50% |
| Phosphorus | 0.65% | 0.69% | 0.19% | 0.75% | 0.81% | 0.65% | | 0.40% |
| Available Phos. | 31% | 23% | | | | | | |
| Potassium | 1.96% | 2.14% | 1.16% | 2.30% | 2.20% | 0.27% | | 0.90% |
| Magnesium | 0.27% | 0.30% | 0.23% | 0.28% | 0.32% | 0.08% | | 0.15% |
| Sulfur | 0.43% | 0.44% | 0.08% | | | 0.71% | | 0.24% |
| Copper (ppm) | 20 ppm | 20 ppm | 16 ppm | 20 ppm | 13 ppm | 14 ppm | | 5 ppm |
| Iron (ppm) | 202 ppm | 176 ppm | 295 ppm | 119 ppm | 110 ppm | 137 ppm | | 95 ppm |
| Manganese (ppm) | 29 ppm | 36 ppm | 10 ppm | 34 ppm | | 5 ppm | | 17 ppm |
| Zinc (ppm) | 50 ppm | 55 ppm | 22 ppm | 50 ppm | 30 ppm | 34 ppm | | 18 ppm |
| Lysine | 2.83% | 3.02% | 0.71% | 3.30% | 4.00% | 5.26% | | 2.08% |
| Methionine | 0.61% | 0.67% | 0.12% | 0.70% | 0.94% | 1.01% | | 0.57% |
| Cysteine | 0.70% | 0.74% | 0.21% | 0.75% | 1.05% | 1.19% | | 0.63% |
| Total Sulfur AA | 1.31% | 1.41% | 0.33% | 1.45% | 1.99% | 2.20% | | 1.10% |
| Threonine | 1.73% | 1.85% | 0.37% | 2.16% | 2.80% | 3.17% | | 1.54% |
| Tryptophan | 0.61% | 0.65% | 0.08% | 0.70% | 0.90% | 1.08% | | 0.45% |
| Isoleucine | 1.99% | 2.16% | 0.37% | 2.25% | 3.10% | 4.25% | | 1.47% |

TABLE 32-continued

Soy Protein Analysis (weight percent or ppm)

| Component | Soybean Meal (44%) | Soybean Meal (dehulled) | Soy Hulls | Soy Flour | Soy Protein Concentrate | Soy Protein Isolate (Ardex) | Soy Oil | Soybean Feed (Arsoy) |
|---|---|---|---|---|---|---|---|---|
| Valine | 2.06% | 2.27% | 0.47% | 2.45% | 3.40% | 4.21% | | 1.87% |
| Arginine | 3.23% | 3.48% | 0.48% | 3.90% | 4.90% | 6.87% | | 2.04% |

TABLE 33

Plant Protein Analysis (weight percent or ppm)

| Component | Sunflower (28%) | Sunflower (35%) | Linseed Meal | Canola | Sunflower (34%) | Sunflower (30%) | Peanut | B-Starch |
|---|---|---|---|---|---|---|---|---|
| Dry matter | 90.0% | 90.0% | 90.0% | 93.0% | 93.0% | 90.0% | 92.0% | |
| Crude Protein | 28.0% | 35.0% | 33.6% | 36.5% | 34.0% | 30.0% | 49.0% | 5.37% |
| % Nitrogen | 4.5% | 5.6% | 5.4% | 5.8% | 5.4% | 4.8% | 7.8% | |
| Fat | 1.3% | 0.8% | 1.8% | 3.5% | 0.5% | 1.3% | 1.2% | 0.44% |
| Fiber | 25.0% | 20.0% | 10.1% | 12.0% | 13.0% | 23.5% | 10.0% | |
| Ash | 6.0% | 6.0% | 6.5% | 6.8% | 7.1% | 6.0% | 6.3% | 1.4% |
| Calcium | 0.35% | 0.35% | 0.39% | 0.62% | 0.30% | 0.35% | 0.20% | 0.19% |
| Phosphorus | 0.90% | 0.95% | 0.83% | 1.03% | 1.25% | 0.95% | 0.63% | 0.25% |
| Available Phos. | 3% | | | 21% | | | 12% | |
| Potassium | 1.10% | 1.05% | 1.26% | 1.24% | 1.60% | 1.11% | 1.15% | 0.11% |
| Magnesium | 0.60% | 0.67% | 0.54% | 0.50% | 0.62% | 0.60% | 0.04% | 0.06% |
| Sulfur | 0.30% | 0.38% | 0.39% | 0.62% | 0.38% | 0.42% | 0.30% | 0.09% |
| Copper (ppm) | 26 ppm | 30 ppm | 22 ppm | 4 ppm | 15 ppm | | 15 ppm | 3.5 ppm |
| Iron (ppm) | 254 ppm | 225 ppm | 270 ppm | 204 ppm | 50 ppm | | 142 ppm | 58 ppm |
| Manganese (ppm) | 41 ppm | 44 ppm | 41 ppm | 52 ppm | 34 ppm | | 29 ppm | 25 ppm |
| Zinc (ppm) | 66 ppm | 87 ppm | 66 ppm | 54 ppm | 100 ppm | | 20 ppm | 70.5 ppm |
| Lysine | 1.12% | 1.25% | 1.24% | 1.93% | 1.19% | 1.08% | 1.66% | — |
| Methionine | 0.69% | 0.75% | 0.59% | 0.73% | 0.74% | 0.66% | 0.52% | — |
| Cysteine | 0.57% | 0.62% | 0.59% | 0.89% | 0.60% | 0.54% | 0.69% | — |
| Total Sulfur AA | 1.26% | 1.37% | 1.18% | 1.62% | 1.34% | 1.20% | 1.21% | — |
| Threonine | 1.06% | 1.22% | 1.26% | 1.54% | 1.15% | 1.07% | 1.27% | — |
| Tryptophan | 0.40% | 0.42% | 0.52% | 0.48% | 0.40% | 0.37% | 0.48% | — |
| Isoleucine | 1.20% | 1.39% | 1.56% | 1.41% | 1.31% | 1.18% | 1.78% | — |
| Valine | 1.51% | 1.73% | 1.74% | 1.91% | 1.64% | 1.49% | 1.98% | — |
| Arginine | 2.36% | 2.80% | 2.97% | 2.21% | 2.70% | 2.39% | 5.09% | — |

The present invention has been described with reference to certain exemplary embodiments, compositions and uses thereof However, it will be recognized by those of ordinary skill in the art that various substitutions, modifications or combinations of any of the exemplary embodiments may be made without departing from the spirit and scope of the invention. Thus, the invention is not limited by the description of the exemplary embodiment, but rather by the appended claims as originally filed.

We claim:

1. A method of increasing nitrogen content in a soil comprising:
    applying a fertilizer composition to a soil, a plant, or the soil and the plant, the fertilizer composition comprising:
    an isolated lysine product having at least 50% lysine, the isolated lysine product being selected from the group consisting of a water soluble salt of lysine, lysine hydrochloride, lysine hydrate, lysine dihydrochloride, lysine sulfate, an aqueous solution of a lysine salt, an aqueous solution of lysine, granular lysine, a lysine cell waste, lysine cell mass, lysine raffinate, a lysine mother liquor, and combinations of any thereof.

2. The method of claim 1, wherein the fertilizer composition further comprises at least one organic compound selected from the group consisting of a cell broth, a protein, a by-product generated at an agricultural product processing facility, and combinations of any thereof.

3. The method of claim 1, wherein the fertilizer composition is applied in an amount from 0.25 lb nitrogen/1000 ft$^2$/month to 3.0 lb nitrogen/1000 ft$^2$/month.

4. The method of claim 1, wherein applying the fertilizer composition is an act selected from the group consisting of spreading a granular form of the fertilizer composition, spraying a homogeneous aqueous solution of the fertilizer composition, and spraying a heterogeneous aqueous solution of the fertilizer.

5. The method of claim 1, wherein the plant is a grass.

6. The method of claim 1, wherein the water soluble salt is dissolved into an aqueous solution prior to dispersion and application to the soil, the plant, or the soil and the plant.

7. The method of claim 1, wherein the fertilizer is mixed with a surfactant, an emulsifier, an antifoaming agent, and a dispersant.

8. The method of claim 7, wherein the surfactant is selected from a group consisting of anionic surfactants, cationic surfactants, non-ionic surfactants, amphoteric surfactants, silicone-based surfactants, alcohol-based surfactants, lecithin and combinations of any thereof.

9. The method of claim 1, wherein the lysine hydrochloride has a nitrogen content of at least 15% by weight.

10. The method of claim 1, wherein the lysine sulfate has a nitrogen content of at least 10% by weight.

11. A method of fertilizing a plant, comprising:
spreading a granular form of an isolated lysine product having at least 50% lysine to a soil, a plant or the soil and the plant.

12. The method of claim 11, wherein the isolated lysine product is lysine hydrochloride.

13. The method of claim 11, wherein the granular form of the isolated lysine product further comprises at least one organic compound selected from the group consisting of a cell broth, a protein, a by-product generated at an agricultural product processing facility, and combinations of any thereof.

* * * * *